US012783335B2

(12) United States Patent
Som et al.

(10) Patent No.: US 12,783,335 B2
(45) Date of Patent: Nov. 3, 2026

(54) MANAGEMENT CONTROLLER-BASED RECOVERY OF UNRESPONSIVE BUS INTERFACE CONTROLLERS

(71) Applicant: HEWLETT PACKARD ENTERPRISE DEVELOPMENT LP, Spring, TX (US)

(72) Inventors: Sukhamoy Som, Spring, TX (US); William E. White, Fort Collins, CO (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 23 days.

(21) Appl. No.: 19/020,900

(22) Filed: Jan. 14, 2025

(65) Prior Publication Data

US 2026/0203152 A1 Jul. 16, 2026

(51) Int. Cl.
*G06F 11/07* (2006.01)

(52) U.S. Cl.
CPC ...... *G06F 11/0772* (2013.01); *G06F 11/0745* (2013.01); *G06F 11/0793* (2013.01)

(58) Field of Classification Search
CPC ............. G06F 11/0745; G06F 11/0772; G06F 11/079; G06F 11/0793
See application file for complete search history.

(56) References Cited

U.S. PATENT DOCUMENTS 7,024,550 B2 4/2006 Collins et al.
9,875,165 B2 * 1/2018 Huang ................ G06F 11/0793
10,846,159 B2 * 11/2020 Arzola ................ G06F 11/0748
11,204,821 B1 * 12/2021 Gopalakrishnan .... G06F 11/076
12,105,859 B2 10/2024 Emerson et al.
2018/0107558 A1 4/2018 Rahardjo et al.

OTHER PUBLICATIONS

Tanous, Ed; "OpenBMC and OCP collaboration"; Open Compute Project; Connect. Collaborate. Accelerate; downloaded Jan. 14, 2025; 8 pp.
Regenscheid, Andrew (NIST SP 800-193, "Platform Firmware Resiliency Guidelines", CSRC; Published May 2018; 2 pp.
STM32 Registers #8, How to use the SPI peripheral; "Using Registers in STM32"; https://controllerstech.com/spi-using-registers-in-stem32/; downloaded Jan. 14, 2024; 19 pp.

* cited by examiner

*Primary Examiner* — Joseph R Kudirka
(74) *Attorney, Agent, or Firm* — Trop, Pruner & Hu, P.C.

(57) ABSTRACT

A computer platform includes a host and a management controller. The management controller operates independently from the host. A hardware processor of the management controller executes a firmware management stack to manage the host. A bus interface controller of the management controller generates bus signals to access a non-volatile memory. A secure enclave of the management controller includes a bus controller interface recovery engine to, responsive to the bus interface controller exhibiting an unresponsive behavior, communicate with the bus interface controller to reset the bus interface controller.

20 Claims, 8 Drawing Sheets

MANAGEMENT CONTROLLER-BASED RECOVERY OF UNRESPONSIVE BUS INTERFACE CONTROLLERS

BACKGROUND

In a computer platform (e.g., a server), electronic devices use communication links, or buses, to transfer data. For this purpose, the electronic devices may include or use respective bus interface controllers (also called "bus controllers"). A bus interface controller generates signals on a bus and senses, or receives, signals from the bus according to a signaling protocol. For a given data transfer, signals on the bus represent information about the data transfer, such as data, an address at which the data is stored or is to be stored, and a command that corresponds to the type (e.g., read or write) of the data transfer.

DETAILED DESCRIPTION

Figure 1:
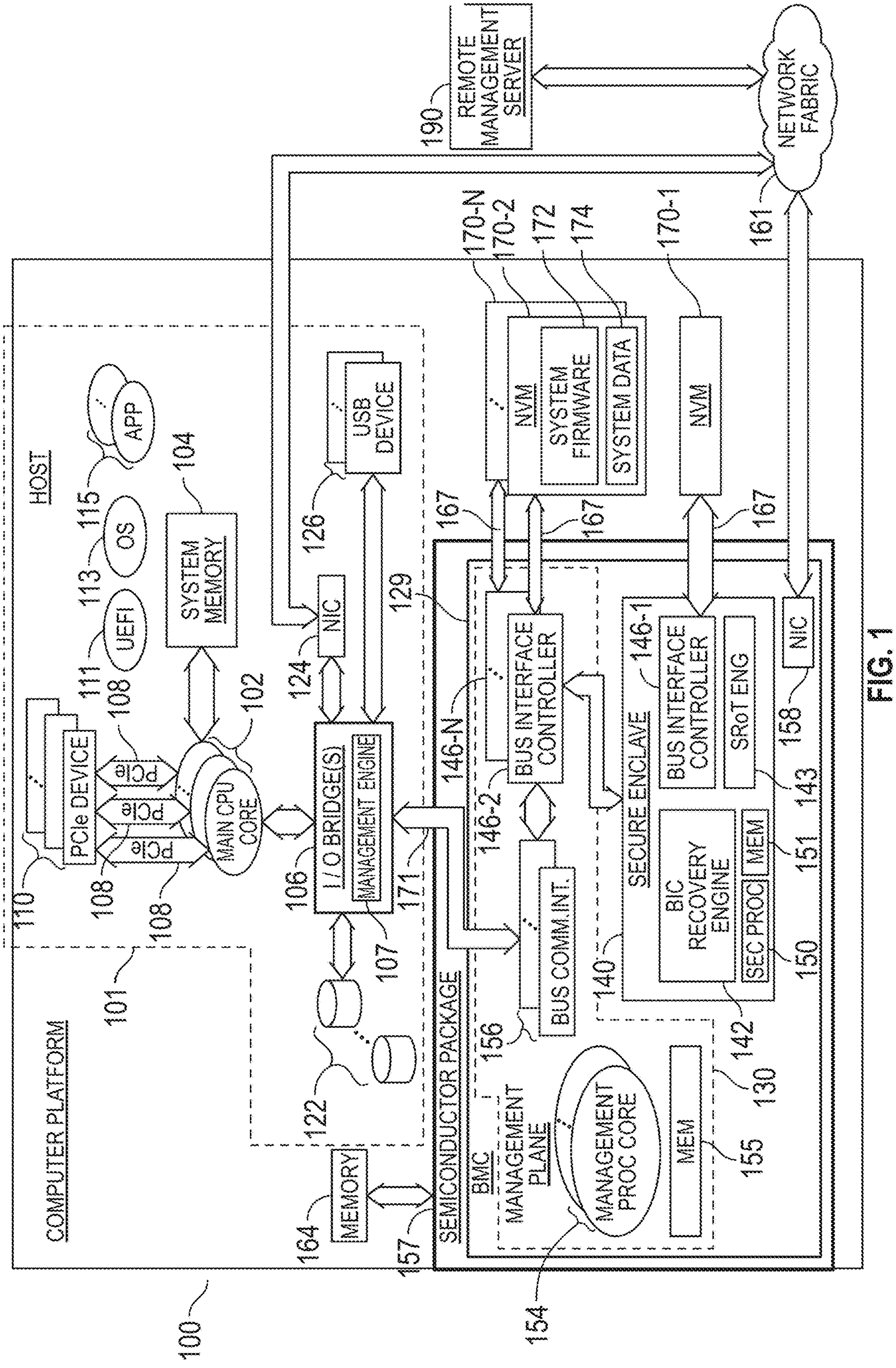
FIG. 1 is a block diagram of a computer platform that has a baseboard management controller-based bus interface controller recovery engine, according to an example implementation.

An "open-computing server" refers to a server that has open-source software and/or open-source firmware. Software or firmware being "open-source" generally means that the software or firmware is distributed publicly; the underlying source code is accessible; and the source code is allowed to be modified (e.g., any modifications permitted or modifications as permitted by the open-source license). Moreover, open-source software or firmware may be free to use. LINUX is an example of open-source operating system software. An OpenBMC firmware management stack is an example of open-source firmware. A baseboard management controller (BMC) executes a firmware management stack for purposes of performing a variety of management-related functions for a server, such as operating system runtime services; resource detection and initialization; virtual media management; telemetry value monitoring; and so forth.

The ever-increasing demand for open-computing servers may be attributable to a number of reasons, such as the relative ease at which open-computing servers may be scaled up and otherwise configured for use in large data centers. In an example of the potential benefits of open-source firmware, a fleet of servers may be manufactured by a number of different server manufacturers, and the use of the same open-source firmware management stack on all of the servers may require less personnel training and reduce the footprint of remote management software used to manage the fleet. Moreover, open-source firmware or software may be better suited for addressing specific use modifications to a server.

A BMC is a relatively complex subsystem that may inevitably experience hardware malfunctions due to underlying defects, or bugs, in its firmware management stack. Moreover, hardware malfunctions in a BMC may be more common when the BMC executes an open-source firmware stack. As a more specific example, an open-source firmware stack may access a bus interface controller (e.g., a Serial Peripheral Interface (SPI) controller) of a BMC through a user space application programming interface (API) (e.g., a LINUX spidev driver). The BMC may also access the bus interface controller through a kernel space driver. The firmware management stack's use or configuration of the bus interface controller may conflict with how the kernel space driver configures or uses the bus interface controller and result in the bus interface controller malfunctioning. In an example, a malfunctioning bus interface controller may "hang up" and be unresponsive to new requests.

In one approach to handling a malfunctioning bus interface controller, a BMC "power cycles" the server, which means that the BMC causes the server to power down and then power back up and reboot. The power cycling of the server temporarily removes power from the bus interface controller so that the bus interface controller reinitializes when power is restored. Power-cycling a server that has a malfunctioning bus interface controller may, however, harm and even potentially permanently damage the server. In an example, as part of the orderly shut-down of a server, the server prepares for the power removal by reading certain system management data from volatile memory and writing the read system management data to non-volatile memory. Therefore, when power is removed, the system management data is preserved. On the subsequent boot, the server retrieves the system management data from the non-volatile memory, which allows the server to be placed in the appropriate state. Writing back volatile memory content to non-volatile memory is impossible if the corresponding bus interface controller is unresponsive and in a locked state.

Therefore, if the power-cycling approach is used to recover the bus interface controller that is used to write system management data to non-volatile memory, then the system management data in volatile memory is not written back to the non-volatile memory (and therefore, is not preserved). Accordingly, the power cycling only achieves a partial recovery.

The BMC and its bus interface controller(s) may be powered by an auxiliary power supply, and the auxiliary power supply may be powered up and down independently from the server's main power supply. Power cycling the auxiliary power supply to recover a BMC-located bus interface controller while keeping the server's main power supply powered up leaves the server temporarily unprotected by the BMC's security services. As such, power cycling the server's auxiliary power supply is not a viable option for recovering a BMC-located bus interface controller.

In accordance with example implementations that are described herein, instead of power cycling a computer platform (e.g., a server) to recover a bus interface controller from a malfunction, a BMC recovers the bus interface controller by performing a targeted reset of the bus interface controller. Therefore, even if the bus interface controller is used to write system management data to non-volatile memory as part of an orderly shut-down of the computer platform, the targeted reset allows the bus interface controller to be recovered and still be used for this purpose. Moreover, the targeted reset preserves the system management data stored in volatile memory, as power to the computer platform is not removed.

In accordance with example implementations, the bus is a serial bus (e.g., an SPI bus) in which data may be transferred between the bus interface controller and a non-volatile memory sequentially, one bit at a time. For this purpose, the bus interface controller generates and responds to signals on the serial bus in accordance with a signaling protocol. In accordance with example implementations, the bus interface controller is part of the BMC. In an example, the bus interface controller is part of the BMC's management plane, and a security processor of the BMC, which is located in a secure enclave of the BMC, serves as a bus interface controller recovery engine (called the "recovery engine" herein). As described herein, in response to the bus interface controller exhibiting an unresponsive behavior, the recovery engine restores the bus interface controller to proper operation by resetting the bus interface controller.

The secure enclave is part of the BMC's security plane, which is protected by a cryptographic boundary and is isolated from the BMC's management plane. In accordance with example implementations, the BMC blocks entities outside of the secure enclave, such as a management plane processing core of the BMC or a host that is managed by the BMC, from resetting the BMC's bus interface controllers. Therefore, in accordance with example implementations, the secure enclave-located recovery engine has exclusive reset control of the BMC's bus interface controllers. Restricting reset control to the secure enclave prevents unintended bus interface controller resets (e.g., a reset due to a bug) as well as prevents bus interface controller resets for nefarious purposes (e.g., a reset in furtherance of a security attack on the server).

In the context that is used herein, the bus interface controller exhibiting an "unresponsive behavior" refers to the bus interface controller failing to act in an expected manner, such as the bus interface controller failing to complete an operation within an expected time or failing to respond to or accept a new request within an expected time interval. In an example of an unresponsive behavior, a bus interface controller malfunctions and fails to complete processing of a request. Correspondingly, the bus interface controller may "hang" and therefore, not be available to, for example, read data from or write data to a particular non-volatile memory.

In other examples of an unresponsive behavior, a bus interface controller fails to complete a bus cycle or fails to complete a phase of a bus cycle within an expected time interval. Here, a "bus cycle" refers to a bus signaling sequence corresponding to a read, write or erase transaction. In a more specific example, the bus interface controller does not complete a command phase (e.g., a phase in which the bus interface controller serially sends out a byte representing a read command, a write command or an erase command) of a bus cycle within an expected time interval. In another example, the bus interface controller does not complete an address phase (e.g., a phase in which the bus interface controller serially sends out bytes representing an address) of a bus cycle within an expected time interval. In another example, for a bus cycle corresponding to a read transaction, the bus interface controller does not complete a dummy phase (e.g., a phase in which the bus interface controller waits for a number of dummy clocks before sampling the bus for received data) of the bus cycle within an expected time interval. In another example, a bus cycle does not complete before an execute timer runs out.

In a more specific example of a reason why the bus controller interface might hang, or become unresponsive, a user-space application uses the bus interface controller while the operating system kernel is doing the same without the use of a semaphore. Because performing a single transaction involves multiple register accesses and the operating system is multithreaded, switching between user-space processes and the kernel, it is possible for a kernel process to interfere with a user process and lead to incorrect programming of the bus interface controller, resulting in a hang.

In accordance with some implementations, a bus interface controller includes a fault detection engine that allows the bus interface controller to self-detect an unresponsive behavior and provide, to the BMC's recovery engine, an indication of the detected unresponsive behavior so that the recovery engine can respond. In an example, the fault detection engine, for each bus cycle, initializes and monitors expiration timers that are associated with different parts (e.g., different phases or the entirety) of the bus cycle. By using the expiration timers, the fault detection engine is able to determine when an entire bus cycle or a portion thereof takes a longer-than-expected time to complete (and therefore, corresponds to a malfunction, or unresponsive behavior).

The fault detection engine may provide any of a number of indications to notify the recovery engine that an unresponsive behavior has been detected. In an example, the fault detection engine generates an interrupt when an unresponsive behavior is detected, and the recovery engine corresponds to an interrupt service routine for the interrupt, which resets the bus interface controller. In another example, the fault detection engine asserts (e.g., sets to a logical one value) a bit of a fault, or error, a register of the bus interface controller, and the assertion of the bit prompts the recovery engine to reset the bus interface controller. In an example, the assertion of the bit generates an interrupt and triggers an interrupt service routine (corresponding to the recovery engine) to reset the bus interface controller. In another example, the recovery engine polls the error register of the bus interface controller for purposes of detecting when the fault detection engine asserts the bit.

In accordance with some implementations, the recovery engine directly detects when the bus interface controller exhibits an unresponsive behavior without relying on the bus interface controller's self-detection. In an example, the bus interface controller has a status register that contains a "busy" bit, which the bus interface controller asserts (e.g., sets, or changes to a logical one value) to indicate that the bus interface controller is currently processing a request. The bus interface controller de-asserts (e.g., clears, or changes to a logical zero value) the busy bit to indicate the bus interface controller is able to receive and process another request. The bus interface controller is expected to process a request within a certain time interval. The recovery engine polls the busy bit (e.g. reads the status register at regular intervals to determine the state of the busy bit) for purposes of detecting when the bus interface controller takes a longer-than-expected time to process a request.

A bus interface controller's unresponsive behavior may be detected in other ways, in accordance with further implementations. In an example, a processing entity that is using or attempting to use the bus interface controller detects the bus interface controller exhibiting an unresponsive behavior. In an example, the processing entity may have received a timeout indication when attempting to write to a non-volatile memory. The processing entity sends a message to the recovery engine notifying the recovery engine about the detection of the unresponsive behavior. In an example, the message originates with a management processing core of the BMC. In another example, the message originates with an application of a host that is managed by the BMC. In an example, the message may be an API call.

The recovery engine may reset a bus interface controller in any of a few different ways. In an example, the recovery engine uses the bus interface controller's "soft reset" feature to reset the controller. In an example, the soft reset involves the recovery engine asserting (e.g., setting) a certain bit of the bus interface controller's global configuration register. The assertion of the bit, in turn, places the bus interface controller in a reset state. To complete the soft reset, the recovery engine subsequently de-asserts the same bit (e.g., clears the bit) to release the bus interface controller from reset. In another example, the recovery engine resets the bus interface controller by writing to a register of the BMC in a manner that causes a hardware circuit of the BMC to toggle a reset terminal of the bus interface controller.

Referring to FIG. 1, as a more specific example, in accordance with some implementations, a computer platform 100 includes a collection of N non-volatile memories (NVMs) 170 (NVMs 170-1, 170-2 and 170-N being depicted in FIG. 1) that are accessed via respective serial links, or buses 167 (called "serial buses 167" herein). In accordance with example implementations, the serial buses 167 correspond to N respective bus interface controllers 146-1 to 146-N. In accordance with example implementations, the bus interface controller 146 (or "bus controller 146") is constructed to receive data representing NVM access requests. In an example, an NVM access request is a write request for purposes of writing data to an NVM 170. In another example, an NVM access request is a read request for purposes of reading data from an NVM 170. In another example, an NVM access request is an erase request for purposes of erasing content of an NVM 170. The bus interface controller 146, as further described herein, is constructed to apply command filtering to validate, or approve, NVM access requests. If the command filtering approves an NVM access request, then the bus interface controller 146 is constructed to generate signals on its respective serial bus 167 for purposes of fulfilling the request.

The signaling on the serial bus 167 corresponds to bus cycles. Each bus cycle is associated with reading from an NVM 170 (i.e., transferring data from the NVM 170 to the bus interface controller 146), writing to an NVM 170 (i.e., transferring data from the bus interface controller 146 to the NVM 170) or erasing content of the NVM 170. A bus cycle may be decomposed into a sequence of phases, such as a command phase, an address phase and a data phase. The command phase communicates a command (e.g., a read, a write or an erase command) to the NVM 170. The address phase communicates an address (e.g., an address at which data is read or written) to the NVM 170. The data phase communicates data (e.g., data being read from or written to the NVM 170). In another example, a bus cycle corresponding to a read includes a dummy phase corresponding to a waiting period (e.g., a number of clock cycles) for the NVM 170 to begin providing, to the serial bus 167, the read data.

In an example, the NVM 170-1, which corresponds to the bus interface controller 146-1, corresponds to a secure memory store for the BMC 129. In an example, the NVM 170-1 stores data representing cryptographic artifacts (cryptographic keys, digital certificates, cryptographic seeds, cryptographic secrets, passwords or other security-related information).

In another example, the NVM 170-2, which corresponds to the bus interface controller 146-2, stores system firmware 172 and system management data 174. In an example, part of the system firmware 172 corresponds to a BMC firmware management stack image. In another example, part of the system firmware 172 corresponds to a BIOS image (e.g., an image corresponding to power on self-test (POST) instructions).

In another example, the system firmware 172 includes instructions that correspond to an "initial portion" of the system firmware 172 and are the first instructions executed by a security processor 150 (e.g., one or multiple physical central processing unit (CPU) cores) of the BMC 129 when the BMC 129 first powers up. As further described herein, the initial portion of the system firmware 172 is first validated by a silicon root of trust, or "SRoT," engine 143 of the BMC 129 before the security processor 150 is released from reset and allowed to execute the portion.

In an example, the system management data 174 represents a system state of the computer platform 100 existing at the time of the current boot of the computer platform 100. In another example, the system management data 174 represents a state of a management engine 107 (e.g., an INTEL Management Engine (ME)) existing at the time of the current boot of the computer platform 100. The management engine 107, in accordance with example implementations, is a processing resource (e.g., a microcontroller that executes a microkernel operating system) for purposes of providing such features as out-of-band management services, a protected audio/video path (e.g., providing high-bandwidth digital content protection (HDCP)), a firmware-based trusted platform module (TPM), as well as providing other components and services for the computer platform 100. As depicted in FIG. 1, the management engine 107 may be located in an input/output (I/O) bridge 106 (e.g., located in a platform controller hub (PCH) chipset)) of the computer platform 100. In accordance with example implementations, the management engine 107 maintains and updates a current version of the system management data in a system memory 104 of the computer platform 100, and the system management engine 107 writes this version to the NVM 170-2 (to update the system management data 174 stored in the NVM 170-2) as part of an orderly shut-down (e.g., a power off as part of the power-cycling or a power off with no immediate power up) of the computer platform 100.

In an example, the system management data 174 includes data representing an anti-replay table. The anti-replay table prevents an attacker from replacing a file of the system management data 174 with an older version file. In another example, the system management data 174 includes data representing a version of firmware executed by the management engine 107, which is also called a "secure version number," or "SVN." In another example, the system management data 174 includes data representing a default configuration file for the management engine 107. In another example, the system management data 174 includes data representing a platform vendor-specific default configuration file for the management engine 107. In another example, the system management data 174 includes data representing a Unified Extensible Firmware Interface (UEFI) variable. In another example, the system management data 174 includes data representing system management basic input/output system (SMBIOS) information. In examples, the other NVMs 170-3 to 170-N may contain information corresponding to UEFI applications as well as other system-related information.

In accordance with example implementations, the BMC 129 includes a bus interface controller recovery engine 142 (called the "recovery engine 142" herein). The recovery engine 142 is constructed to recover the bus interface controller 146-2 in the event that the bus interface controller 146-2 malfunctions. In this context, "recovering" a bus interface controller refers to a sequence of one or multiple events to restore the bus interface controller to a state in which the bus interface controller no longer exhibits an unresponsive behavior.

More specifically, in accordance with example implementations, the recovery engine 142 responds to the bus interface controller 146-2 exhibiting an unresponsive behavior by resetting the bus interface controller 146-2. By using a targeted reset of the bus interface controller 146-2 and not power cycling the computer platform 100, the bus interface controller 146-2 is allowed to recover and be available for writing the current version of the system management data 174 to the NVM 170-2 when the computer platform 100 shuts down.

In accordance with example, implementations, the recovery engine 142 is also constructed to respond to one or multiple other bus interface controllers 146 (other than the bus controller 146-2) of the computer platform 100 exhibiting unresponsive behaviors by resetting the bus interface controller(s) 146. In an example, the recovery engine 142 is constructed to reset any bus controller 146 of the collection of bus interface controllers 146-1 to 146-N in response to the bus interface controller 146 exhibiting an unresponsive behavior. In another example, the recovery engine 142 is constructed to reset the bus controller 146-1 or the bus controller 146-2 in response to either bus interface controller 146-1 or 146-2 exhibiting an unresponsive behavior. In another example, the recovery engine 142 is limited in scope to reset just the bus controller 146-2 in response to the bus interface controller 146-2 exhibiting an unresponsive behavior.

A "non-volatile" memory device, in the context used herein, refers to a memory device that is able to persistently store data, even if power is removed from the memory device. In some examples, each of the NVMs 170-1 to 170-N is implemented with a collection of flash read-only memory (ROM) devices, such as NOR flash memory devices or NAND flash memory devices. In other examples, the NVMs 170-1 to 170-N can be implemented using other types of memory devices A "bus," in the context that is used herein, refers to any communication link that includes a collection of signal lines (a single signal line or multiple signal lines) over which data can be transferred. A "serial bus" refers to any communication link that includes a collection of signal lines (a single signal line or multiple signal lines) over which data can be transferred sequentially one bit at a time. A serial bus may be associated with half duplex communication (e.g., a given bus interface controller 146 either transmits or receives at a given time) or full duplex communication (e.g., a given bus interface controller 146 can simultaneously transmit and receive). In examples, a serial bus 167 is an SPI bus. In other examples, the serial bus 167 is an Inter-Integrated Circuit (I2C) bus, an Improved I2C (I3C) bus, or another type of serial bus.

In examples where the serial bus 167 is an SPI bus, the associated bus interface controller 146 is an SPI controller. If the serial bus 167 is another type of bus, then the associated bus interface controller 146 can be a different type of bus controller, such as an I2C bus controller, an I3C controller, or another type of bus controller.

The components of the BMC 129, in accordance with example implementations, includes a management plane 130 and a secure enclave 140. The secure enclave 140 corresponds to a security plane, which is isolated from the management plane 130. The management plane 130 includes one or multiple main management processing cores 154 that execute instructions of a BMC firmware management stack for purposes of performing a variety of management-related functions for host(s) 101 of the computer platform 100. As examples, the BMC 129 provides such management-related functions as operating system runtime services; resource detection and initialization; and pre-operating system services. In other examples, the management-related functions include the BMC 129 monitoring telemetry values (e.g., cooling fan speeds, temperature sensors and tamper indication sensors) and reporting unexpected or out-of-range telemetry values. The firmware management stack may or may not be an open-source stack, depending on the particular implementation.

The management-related functions may also include remotely-managed functions. As examples, the remotely managed functions include keyboard video mouse (KVM) functions; virtual power functions (e.g., remotely activated functions to remotely set a power state, such as a power conservation state, a power on, a reset state or a power off state); virtual media management functions; and one or multiple other management-related functions for the host(s) 101. In accordance with example implementations, for purposes of performing its management-related services, the BMC 129 may communicate with a remote management server 190. In examples, this communication may occur via a network interface controller (NIC) 158 of the BMC 129 or a NIC 124 of a host 101.

As depicted in FIG. 1, among its other features, the management plane 130 includes the bus interface controllers 146-2 to 146-N and a volatile memory 155. The management processing cores 154 retrieve instructions from the volatile memory 155 for execution. The management plane 130 further includes one or multiple bus communication interfaces 156 that are accessible by the host(s) 101. In an example, the bus communication interfaces 156 contain registers that are associated with an API that is provided by the management plane 130. Through the API, applications 115 may communicate with the BMC 129 using an input/output control (IOCTL) interface driver, representational state transfer (REST) API calls (e.g., Redfish API calls), or some other system software proxy.

The recovery engine 142 and the bus interface controller 146-1, in accordance with example implementations, are part of the secure enclave 140. As depicted in FIG. 1, the secure enclave 140 includes the bus interface controller 146-1, the security processor 150, a volatile memory 151 and the SRoT engine 143. Although called a "silicon" root of trust engine, the SRoT engine 143 may be fabricated on a semiconductor substrate other than silicon, in accordance with further implementations.

The secure enclave 140 stores an immutable fingerprint, which, on a power up of the BMC 129, is used by the SRoT engine 143 to validate an initial portion of the system firmware 172 before the security processor 150 executes the initial portion. In accordance with example implementations, in response to BMC 129 powering up, the SRoT engine 143 holds the security processor 150, the management processing cores 154 and main CPU cores 102 of the computer platform 100 in reset until the SRoT engine 143 validates the initial portion of the system firmware 172. More specifically, the SRoT engine 143 validates and loads the initial portion of the system firmware 172 into the volatile memory 151 of the secure enclave 140 so that this initial portion is now trusted. Moreover, prior to the loading of the firmware portion into the volatile memory 151, the SRoT engine 143 locks the memory 151 from writes. After successful validation of the initial portion of the firmware 172, the SRoT engine 143 releases the security processor 150 from reset to allow the security processor 150 to execute the loaded firmware instructions.

By executing the firmware instructions, the security processor 150 may then validate one or more portions of the system firmware 172 containing additional instructions for the security processor 150 to execute. Additionally, the security processor 150, in accordance with example implementations, validates another portion of the system firmware 172 that corresponds to a portion of the BMC's management firmware stack. After successful validation, the security processor 150 loads this portion of the firmware stack into the volatile memory 155 of the management plane 130, and this portion of the management firmware stack may then be executed by the main processing core(s) 154 (when released from reset), which causes the main processing core(s) 154 to load additional portions of the firmware 172 and place the loaded portions into a volatile memory 164 outside of the BMC 129. Access to the volatile memory 164 may involve additional training and initialization steps (e.g., training and initialization steps set forth by the DDR4 specification). Those instructions may be executed from the validated portion of the BMC's firmware management stack in the volatile memory 155.

Therefore, in accordance with example implementations, a cryptographic chain of trust, which is anchored by the SRoT engine 143, may be extended from the SRoT to the firmware management stack that is executed by the BMC's main processing cores 154. Moreover, for the boot of the host 101, the firmware management stack that is executed by the main processing core(s) 154 may validate host system firmware, such as UEFI 111 firmware, thereby extending the chain of trust to the host system firmware.

The secure enclave 140, in accordance with example implementations, is fully disposed inside a cryptographic boundary. A "cryptographic boundary" in this context refers to a continuous boundary, or perimeter, which contains the logical and physical components of a cryptographic subsystem, such as BMC components that form the secure enclave. The secure enclave 140, in accordance with example implementations, is isolated from the BMC's management plane 130. In the context used herein, a "secure enclave" refers to a subsystem, such as a subsystem of the BMC 129, for which access into and out of the subsystem is tightly controlled. The secure enclave can also be referred to as a "secure boundary" or a "secure perimeter," or any other like term. A more detailed example architecture for a secure enclave is described below in connection with FIG. 2.

As depicted in FIG. 1, in accordance with example implementations, the components of the BMC 129 are located inside a semiconductor package (or "chip") 157. Depending on the particular implementation, the semiconductor package 157 may contain one die or multiple dies (or "dice"). The semiconductor package 157 may have one of many different forms. In an example, a semiconductor package 157 may contain one or multiple dies (corresponding to respective integrated circuits) that are mounted on a printed circuit board (PCB) substrate that interconnects the dies. In another example, a semiconductor package 157 may contain multiple dies that are interconnected by bonding wires. In an example, a semiconductor package is encapsulated. In another example, a semiconductor package 157 is not encapsulated. In other examples, a semiconductor package 157 may correspond to any of a number of different containers, such as a surface mount package, a through-hole package, a ball-grid array package, a small outline package or a chip-scale package. Regardless of its particular form, the semiconductor package 157 operatively electrically couples its integrated circuit(s) to a motherboard of the computer platform 100.

The computer platform 100, in accordance with example implementations, is a modular unit, which includes a frame, or chassis. Moreover, this modular unit may include hardware that is mounted to the chassis and is capable of executing machine-readable instructions. In examples, the computer platform 100 is a server, such as a blade server, a rack server or a tower server. In other examples, the computer platform 100 may be a component other than a server, such as a client, a desktop, a smartphone, a wearable computer, a networking component, a gateway, a network switch, a storage array, a portable electronic device, a portable computer, a tablet computer, a thin client, a laptop computer, a television, a modular switch, a consumer electronics device, an appliance, an edge processing system, a sensor system, a watch, a removable peripheral card, or, in general, any other processor-based electronic device.

In accordance with example implementations, the computer platform 100 has an auxiliary power supply (not shown), which provides auxiliary power for the BMC 129 when AC power is available (e.g., when a power cord for the computer platform 100 is plugged into a power receptacle). The BMC 129, including the secure enclave 140, powers on when the auxiliary power is available. In an example, the management processing cores 154, memory 155, the secure enclave 140, networking components, as well as other components of the BMC 129 are powered by the auxiliary power. The powering on of the computer platform's host(s) 101 occurs later in response to a host power request. The hosts(s) 101 are powered by a main power supply (not shown). In the context that is used herein, the "power cycling" of the computer platform 100 refers to a sequence that includes the main power supply being powered off and then the host(s) 101 rebooting after main power is restored. In an example, power cycling of the computer platform 100 includes the main power supply being powered down and then being powered back up, while the auxiliary power remains powered on.

In the context that is used herein, a "host" refers to a collection of components of the computer platform 100, which have an unabstracted view of the resources of the computer platform 100. For the example implementation that is depicted in FIG. 1, the resources for a host 101 include the main CPU cores 102 (e.g., CPU processing cores) and memory devices that are connected to the main CPU core(s) 102 to form the system memory 104. The host 101 operates under control of an operating system 113 (e.g., a LINUX operating system, a WINDOWS operating system or other operating system) independently of the BMC 129. In accordance with some implementations, the computer platform 100 may contain multiple hosts 101. The BMC 129, in accordance with example implementations, provides management-related services and security-related services for each host 101.

The main CPU core(s) 102 may be coupled to one or multiple I/O bridges 106, which allow communications between the main CPU core(s) 102 and the BMC 129, as well as communications with various devices, such as storage drives 122; one or multiple NICs 124; one or multiple Universal Serial Bus (USB) devices 126; I/O devices; a video controller; and so forth. As depicted in FIG. 1, the NIC(s) 124 may be coupled to network fabric 161. Moreover, as also depicted in FIG. 1, the computer platform 100 may include one or multiple Peripheral Component Interconnect Express (PCIe) devices 110 (e.g., PCIe expansion cards) that may be coupled to the main CPU core(s) 102 through corresponding individual PCIe bus(es) 108. In accordance with a further example implementation, the PCIe device(s) 110 may be coupled to the I/O bridge(s) 106, instead of being coupled to the main CPU core(s) 102. In accordance with yet further implementations, the I/O bridge (s) 106 and PCIe interfaces may be part of the main CPU core(s) 102.

In general, the memory devices that form the system memory 104, as well as other memories and storage media that are described herein, may be formed from non-transitory memory devices, such as semiconductor storage devices, flash memory devices, memristors, phase change memory devices, a combination of one or more of the foregoing storage technologies, and so forth. Moreover, the memory devices may be volatile memory devices (e.g., dynamic random access memory (DRAM) devices, static random access (SRAM) devices, and so forth) or non-volatile memory devices (e.g., flash memory devices, read only memory (ROM) devices and so forth), unless otherwise stated herein.

In accordance with some implementations, one or multiple of the PCIe devices 110 may be intelligent input/output peripherals, or "smart I/O peripherals," which may provide backend I/O services for one or multiple applications 115 (or application instances) that execute on the computer platform 100. A "smart I/O peripheral" may also be referred to as a data processing unit (DPU) or infrastructure processing unit (IPU). In general, a smart I/O peripheral is a hardware processing unit that has been assigned (e.g., programmed with) a certain personality. A smart I/O peripheral may provide one or multiple backend I/O services (or "host offloaded services) in accordance with its personality. The backend I/O services may be non-transparent services (e.g., hypervisor virtual switch offloading services) or transparent services (encryption services, compression services, packet processing services, overlay network access services and firewall-based network protection services).

In accordance with example implementations, the network fabric 161 may be associated with one or multiple types of communication networks, such as (as examples) Fibre Channel networks, Compute Express Link (CXL) fabric, dedicated management networks, local area networks (LANs), wide area networks (WANs), global networks (e.g., the Internet), wireless networks, or any combination thereof.

As used herein, an "engine," such as the recovery engine 142 can refer to one or more circuits. For example, the circuits may be hardware processing circuits, which can include any or some combination of a microprocessor, a core of a multi-core microprocessor, a microcontroller, a programmable integrated circuit (e.g., a programmable logic device (PLD), such as a complex PLD (CPLD)), a programmable gate array (e.g., field programmable gate array (FPGA)), an application specific integrated circuit (ASIC), or another hardware processing circuit. An "engine" can refer to a combination of one or more hardware processing circuits and machine-readable instructions (software and/or firmware) executable on the one or more hardware processing circuits. In an example and as further described below in connection with FIG. 2, the recovery engine 142 may be formed by a security processor, such as the security processor 150, executing machine-readable instructions that are stored in a memory, such as the non-volatile memory 151. In other examples, the recovery engine 142 can be formed in whole or in part by a PLD, ASIC, FPGA or other hardware of the BMC 129.

Figure 2:
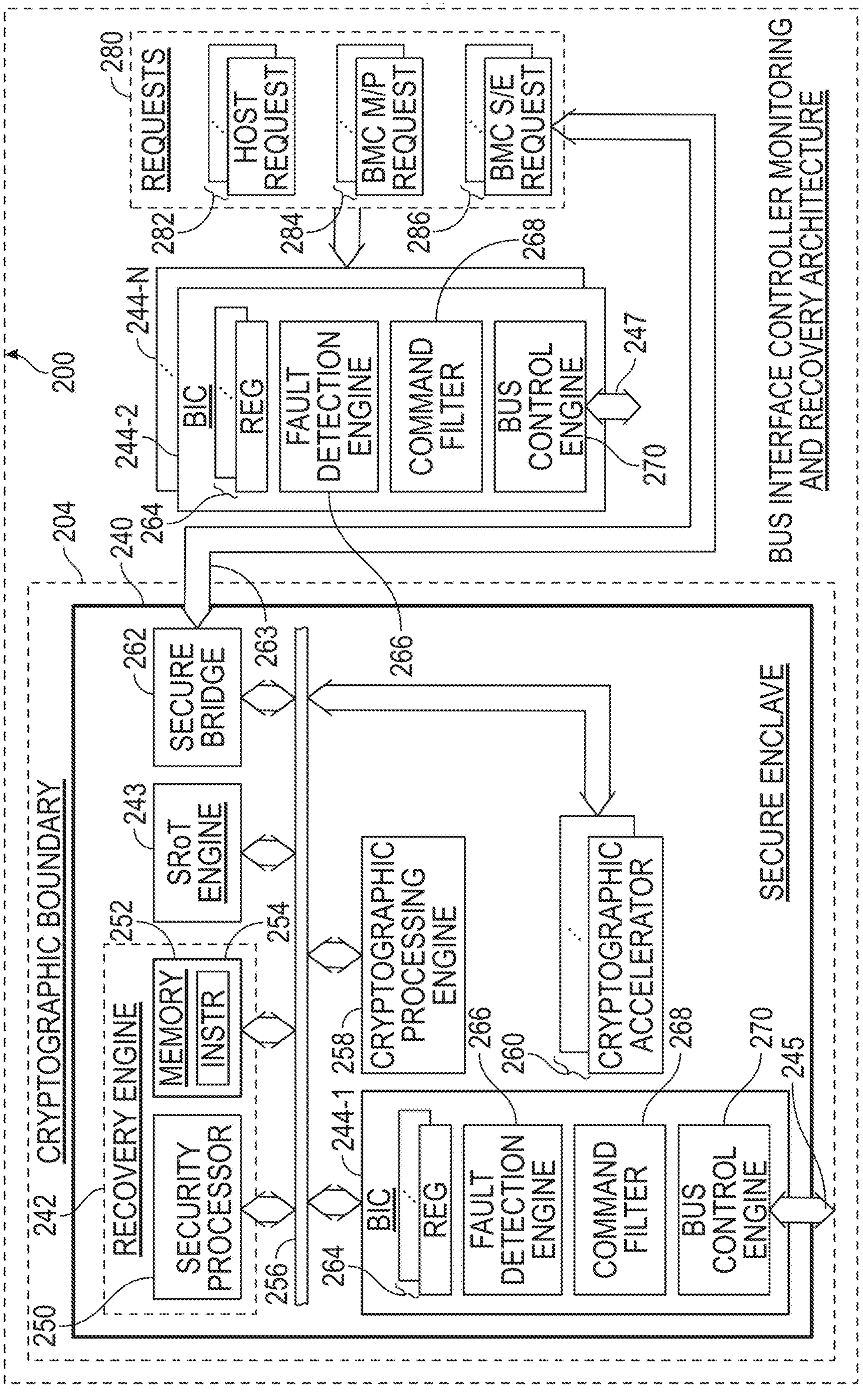
FIG. 2 is a block diagram of a bus interface controller monitoring and recovery architecture, according to an example implementation.

FIG. 2 depicts a block diagram of a bus interface controller monitoring and recovery architecture 200 (called "the architecture 200" herein), in accordance with example implementations. Referring to FIG. 2, the architecture 200 includes N bus interface controllers 244 (bus interface controllers 244-1, 244-2 and 244-N being depicted in FIG. 2). The architecture 200 further includes a secure enclave 240 that includes a bus interface controller recovery engine 242 (called the "recovery engine 242" herein), which, in accordance with example implementations, is constructed to reset any of the controllers 244 that exhibit an unresponsive behavior. The bus interface controllers 146, the secure enclave 140 and the recovery engine 142 of FIG. 1 are examples of the bus interface controllers 244, the secure enclave 240 and the recovery engine 242, respectively. Similar to the secure enclave 140 of FIG. 1, the secure enclave 240 may be part of a BMC and associated with the BMC's security plane.

The bus interface controller 244-1 is located inside the secure enclave 242. Responsive to NVM access requests (e.g., read, write and erase requests) that are generated by a security processor 250 of the secure enclave 240, the bus interface controller 244-1 generates signals on a serial bus 245 for purposes of providing bus cycles on the serial bus 245 to access an NVM. In an example, the NVM accessed via the serial bus 245 may be a secure memory store for the secure enclave 240 and store cryptographic artifacts (cryptographic keys, digital certificates, cryptographic seeds, cryptographic secrets, passwords or other security-related information).

The bus interface controllers 244-2 to 244-N are located outside of the secure enclave 240. In an example, the bus interface controllers 242-2 to 244-N are part of a BMC (e.g., the BMC 129 of FIG. 1) and are affiliated with the BMC's management plane. The bus interface controllers 244-2 to 244-N each generates signals on a respective serial bus 247 for purposes of providing bus cycles on the serial bus 247 to access an NVM. The NVMs coupled to the serial buses 245 may store any of a variety of data for a computer platform. In an example an NVM may store system data (e.g., data associated with a management engine, such as the management engine 107 of FIG. 1) and system firmware (e.g., BIOS firmware, firmware to start up the security processor 250 and BMC management stack firmware). In another example, an NVM may store UEFI applications.

Each of the bus interface controllers 244-2 to 244-N may receive requests 280 from a variety of sources. In examples, a given request 280 may be directed to reading data from an NVM, writing data to an NVM, erasing content of an NVM, reading the content of a status register 264 of a bus interface controller 244 or writing to a configuration register 264 of a bus interface controller 244.

In an example, the requests 280 include requests 286 that are originate with the secure enclave 240. In an example, a read request 286 is generated by an SRoT engine 243 of the secure enclave 240 for purposes of loading firmware (e.g., an initial portion of firmware) into a non-volatile memory 252 of the secure enclave 240 for execution by the security processor 250. In another example, a read request 286 is generated by the security processor 250 for purposes of reading a register 264 of a bus interface controller 244 for purposes of determining the status (e.g., a busy status, a fault status or other status) of the bus interface controller. In another example, a write request 286 is generated by the security processor 250 for purposes of asserting a reset bit of a register 264 (e.g., a global configuration register) of a bus interface controller 244 for purposes of placing the bus interface controller 244 in a reset state. In another example, a write request 286 is generated by the security processor 250 for purposes of de-asserting the reset bit for purposes of releasing the bus interface controller 244 from reset.

The requests 280 also include requests 284 that originated with the management plane of the BMC. In an example, a read request 284 is generated by a management processing core (e.g., a management processing core 154 of FIG. 1) of the BMC for purposes of loading instructions of the BMC firmware management stack into a volatile memory (e.g., the volatile memory 155 of FIG. 1) for execution by the management processing core 154.

The requests 280 also include requests 282 that originate with a host (e.g., the host 101 of FIG. 1) of the computer platform 100 (although the request may be received via a management plane API and converted into another request that the management plane sends to the bus interface controller 244). In an example, a main CPU core (e.g., the main CPU core 102 of FIG. 1) generates a read request 282 for purposes of loading system firmware instructions (e.g., UEFI or BIOS instructions) into a system memory (e.g., the system memory 104 of FIG. 1) for execution by one or multiple CPU processing cores. In another example, a management engine (e.g., the management engine 107 of FIG. 1) of the computer platform generates a read request 282 for purposes of reading data representing a system management state. In another example, a management engine, responsive to power down of the computer platform, generates a write request 282 for purposes of writing system management data to an NVM.

The bus interface controller 244 includes registers 264. In examples, the registers 264 include a data transmit register, a data receive register, a flow control register, a command register, an address register, an error register, a global configuration register and a command filter register. In an example, an entity submits a request to the bus interface controller 244 by writing data to the appropriate registers 264 of the bus interface controller 244. In an example, a write request involves the entity writing to command, address and data registers 264 of the bus interface controller 244. In another example, a read request involves the entity writing to command and address registers 264 of the bus interface controller 244 and reading the corresponding read data from a data register 264 of the bus interface controller 244. In another example, the registers 264 include a command filter register 264.

The bus interface controller 244 includes a bus control engine 270 that controls communications over the serial bus with the NVM. The bus control engine 270 may be implemented using a portion of the hardware processing circuit or machine-readable instructions of the bus interface controller 244.

The bus interface controller 244 includes a command filter 268 that is constructed to selectively allow or disallow commands for accessing (reading or writing) the NVM. Examples of commands include a read command to read data, a write command to write data, a delete command to delete data (e.g., an erase command that can erase an entire memory or some specified portion of the memory), and/or other commands.

In some examples, the command filter register 264 stores a list of commands. A "list" of commands can refer to a single command or multiple commands. In some examples, the list of commands includes a list of approved commands that are allowed to be executed with respect to the NVM. In such examples, when the command filter 268 receives a command to access the NVM, the command filter 268 compares the received command against the list of approved commands, and if the received command is part of the list of approved commands, the command filter 268 allows the received command to be executed with respect to the NVM.

In a different example, the list of commands includes a list of disapproved commands that are not allowed to be executed with respect to the NVM. In such examples, the command filter 268 compares the received command with the list of disapproved commands, and if the received command is part of the list of disapproved commands, the command filter 268 blocks the received command from being executed with respect to the NVM.

The bus interface controller 244, in accordance with example implementations, blocks bus interface controller reset-related requests 280 from entities (e.g., a host, a management processing core) that are outside of the secure enclave 240. This allows the recovery engine 242 to have exclusive control of the resetting of the bus interface controllers 244. In this context, a "reset-related request" (or "bus interface controller reset-related request") refers to a write that manipulates a reset state of the bus interface controller 244, such as a write to place the bus interface controller 244 in reset or a write to release the bus interface controller 244 from reset.

In accordance with example implementations, a global configuration register 264 of the bus interface controller 244 has a bit that is asserted (e.g., set, or placed in a logic one state) to place the bus interface controller 244 in reset and de-asserted (e.g., cleared, or placed in a logic zero state) to release the bus interface controller 244 from reset. The global configuration register 264 has a lock bit that, after being asserted (e.g., set to a logic one), exclusively restricts writes to the reset bit to entities within the secure enclave 140. In an example, the recovery engine 242, as part of the initialization of the BMC, asserts the lock bit, and the lock bit cannot then be de-asserted except by a secure enclave entity. After assertion of the lock bit, only a secure enclave entity, such as the recovery engine 242, can manipulate the state of the reset bit for purposes of placing the bus interface controller 244 in reset or releasing the bus interface controller 244 from reset. In accordance with example implementations, each request 280 carries an ownership code, which allows the bus interface controller 244 to identify the entity that is associated with the request 280, and therefore, when the lock bit is asserted, the bus interface controller 244 blocks manipulation of its reset state by an entity outside of the secure enclave 240.

As depicted in FIG. 2, the secure enclave 240 is contained within a tightly-controlled cryptographic boundary 204. In general, the components of the secure enclave 240 may communicate with each other using a bus infrastructure 256. In accordance with example implementations, the bus infrastructure 256 may include such features as a data bus, a control bus, an address bus, a system bus, one or multiple buses, one or multiple bridges, and so forth.

In an example and as depicted in FIG. 2, the recovery engine 242 is formed by the security processor 250 executing processor-readable instructions 254 that are stored in the volatile memory 252. In another example, the recovery engine 242 may correspond to a dedicated hardware circuit that does not execute instructions. In another example, the recovery engine 242 may correspond to such a dedicated hardware circuit and correspond to the security processor 250 executing instructions. In an example, the volatile memory 252 is a static random access memory (SRAM).

The secure enclave 240, in accordance with example implementations, includes a secure bridge 262 that, via a secure interconnect 263, controls access to the secure enclave 240 (i.e., establishes a fire wall for the secure enclave 240). As examples, the secure interconnect 263 may include a bus or an internal interconnect fabric, such as Advanced Microcontroller Bus Architecture (AMBA) Advanced eXtensible Interface (AXI) fabric, or AMBA Advanced High-Performance Bus (AHB) fabric.

In accordance with example implementations, the secure bridge 262 includes an upstream interface to allow the secure enclave 240 to "reach out" to the secure interconnect 263. This allows the recovery engine 242 to send requests to the bus interface controllers 244-2 to 244-N for such purposes as accessing registers to assess whether any bus interface controller 244-2 to 244-N is exhibiting an unresponsive behavior and resetting any bus interface controller 244-2 to 244-N that is exhibiting an unresponsive behavior. The secure enclave 240 may use the upstream interface to access firmware (e.g., the system firmware 172 of FIG. 1) for purposes of validating the firmware (e.g., validating an initial portion of the system firmware 172 of FIG. 1) and loading firmware (e.g., loading the initial portion of the system firmware 172 of FIG. 1) into the volatile memory 252.

The secure bridge 262 may employ filtering and monitoring on the secure interconnect 263 to prevent unauthorized access inside the cryptographic boundary 204. In accordance with example implementations, a BMC management plane (e.g., the management plane 130 of FIG. 1) may communicate with the secure enclave 240 via the execution of one or multiple security service APIs that are provided and handled by the secure bridge 262.

The secure enclave 240 may include various components to provide security-related services for a computer platform. In an example, the secure enclave 240 includes a cryptographic processing engine 258 that encrypts data written to the NVM coupled to the bus interface controller interface 244-1 and decrypts data read from the NVM. In another example, the secure enclave 240 includes one or multiple cryptographic accelerators 260, such as symmetric and asymmetric cryptographic accelerators, which assist the security processor 250 with such operations as key generation, signature validation, encryption, decryption, hashing, and so forth. The cryptographic accelerators 260 may include a true random number generator to provide a trusted entropy source for cryptographic operations. Moreover, the cryptographic accelerators 260 may include a deterministic random number generator (DRNG). In another examples, the security-related services include the secure enclave 240 detecting and reporting an unexpected inventory (e.g., an observed inventory that is different from an inventory corresponding to a base platform certificate and any delta platform certificate(s)).

In another example of additional components, the secure enclave 240 may include a tampering detection circuit that receives one or multiple environmental signals (e.g., sensor signals representing a die temperature, a clock rate, a supply voltage magnitude, an enclosure opening status, a removal status, and so forth) from the computer platform, which the tampering detection circuit uses to detect tampering. In another example, the secure enclave 240 includes a collection of one-time programmable (OTP) fuses that store data that represents immutable attributes. Among its other features, the secure enclave 240 may have other components that, as can be appreciated by one of ordinary skill in the art, may be present in a processor-based architecture, such as a timer, an interrupt controller, and so forth.

Detecting an unresponsive behavior of a bus interface controller 244 may be performed in any of a number of different ways. In an example and as depicted in FIG. 2, the bus interface controller 244 includes a fault detection engine 266 that allows the controller 244 to self-detect an unresponsive behavior. In accordance with example implementations, the fault detection engine 266 monitors states of the bus interface controller 244 corresponding to different parts of a bus cycle for purposes of determining whether the bus cycle or a portion thereof takes an unexpectedly long time to complete. A bus cycle or a portion thereof taking an unexpectedly long time to complete is referred to herein as the bus interface controller 244 "hanging," or exhibiting an unresponsive behavior. As further described herein, the fault detection engine 266 may use an expiration timer for purposes of determining when a bus cycle or a portion thereof takes an unexpectedly long time to complete. Upon the fault detection engine 266 detecting an unresponsive behavior, the fault detection engine 266 notifies the recovery engine 242. This notification may occur in a number of different ways, as further described below.

Figure 3:
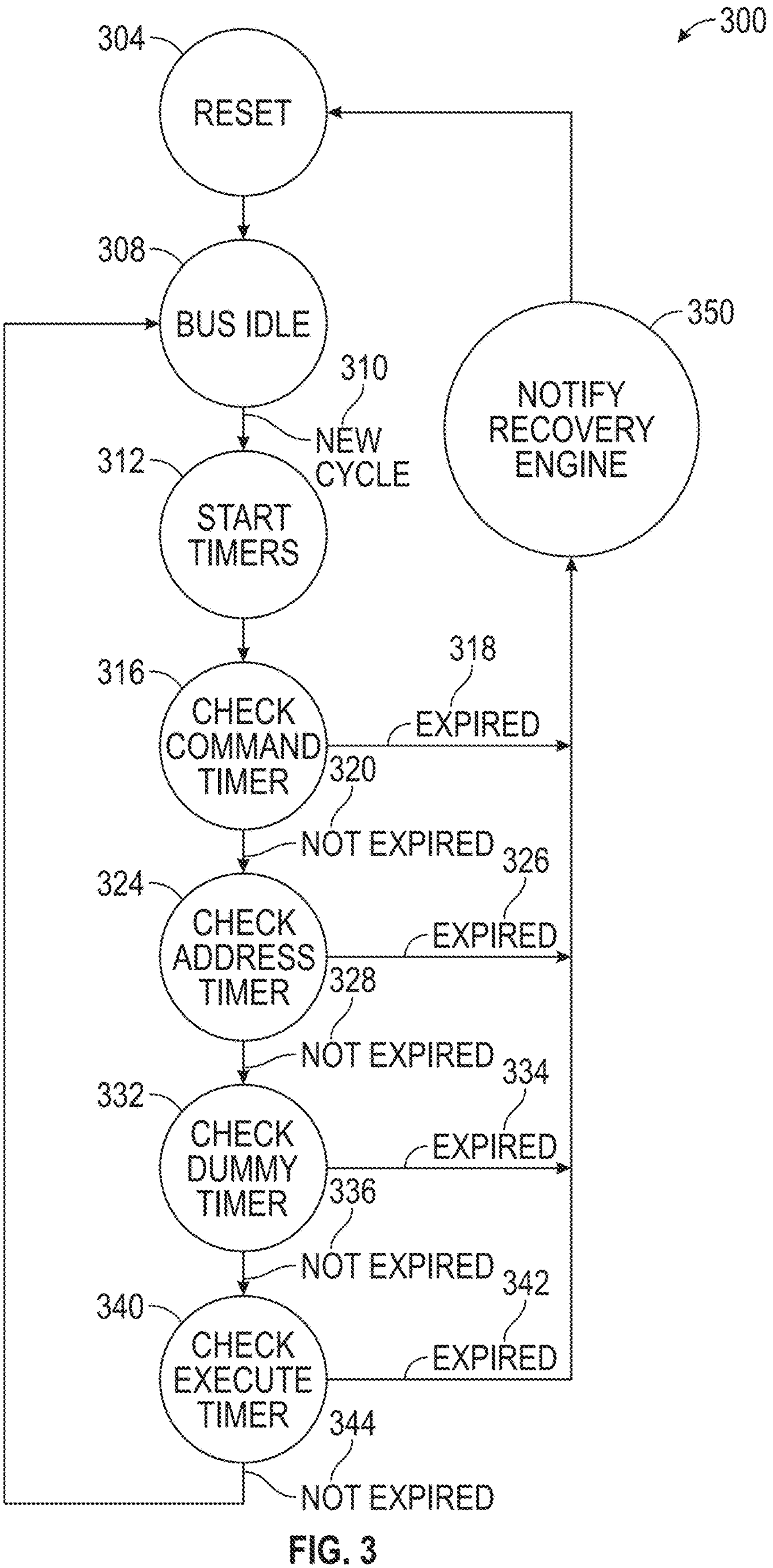
FIG. 3 is a state diagram depicting states and state transitions of a fault detection engine that detects malfunctioning of a bus interface controller, according to an example implementation.

FIG. 3 depicts an example state diagram 300 used by a fault detection engine, such as the fault detection engine 266 of FIG. 2, in accordance with example implementations. Referring to FIG. 3, the state diagram 300 depicts states and corresponding state transitions associated with a particular bus cycle.

More specifically, before a bus cycle begins, the fault detection engine is in a bus idle state 308. It is noted that the fault detection engine may enter the bus idle state 308 from a reset state 304, which is the engine's initial state after the bus interface controller is reset. The fault detection engine, as depicted at 310, transitions from the bus idle state 308 in response to the beginning of a new bus cycle. More specifically, the fault detection engine transitions from the bus idle state 308 to a state 312 in which the fault detection engine starts a collection of timers. In this context, "starting" a timer refers to initializing the timer so that the timer has an initial value and begins to count up or down, depending on the particular implementation.

The fault detection engine uses the timers to determine whether any particular part (e.g., a particular phase or the entire bus cycle) of the bus cycle takes a longer time to complete than expected. In accordance with example implementations, a particular part of the bus cycle taking a longer time to complete than expected corresponds to the bus interface controller exhibiting an unresponsive behavior. In an example, an address phase of a SPI bus cycle corresponds to four bytes, or thirty-two bits. Therefore, the address phase should not be more than thirty-two SPI clock periods. In an example, the fault detection engine includes an address phase timer, which is set to expire at thirty-three SPI clock periods after the beginning of the address phase, and the expiration indicates that the address phase was longer than expected.

The timers measure the times of respective associated phases of the bus cycle to complete, and each timer indicates whether the associated phase took a longer-than-expected time to complete (or never completed). In an example, the timers are expiration timers, and the bus interface controller stops or resets each expiration timer at the completion of the associated phase. If a particular expiration timer counts, or measures, a time that exceeds a respective threshold (e.g., the timer counts up and overflows, or the timer counts down and reaches a zero value), then the timer provides a corresponding indication (e.g., sets an overflow flag) that the associated phase lasted for a longer-than-expected time. In another example, the expiration timers include an expiration timer that measures the entire bus cycle for purposes of indicating whether the overall execution time lasted for a longer-than-expected time.

In an example, the fault detection engine has a timer for each corresponding phase of the bus cycle. In an example, a bus cycle includes a command phase in which the bus interface controller generates a sequence of bits (e.g., a sequence of bits representing a byte), which represent a command (e.g., a write command, a read command or an erase command) associated with the bus cycle. As an example, for a SPI bus, all SPI commands are exactly one byte. Therefore, an example, the fault detection engine includes a command phase timer that is set to expire at eight SPI clock periods, and the expiration indicates that the command phase was longer than expected.

In another example, a bus cycle has an address phase that follows the command phase, and the bus interface controller has a corresponding address phase timer, such as the address timer for the SPI bus set forth discussed above. In the address phase, the bus interface controller generates a sequence of bits (e.g., a sequence representing multiple bytes) representing a targeted address of the NVM. In another example, the bus cycle includes a dummy phase that follows the address phase. In the dummy phase, the bus interface controller waits for a response from the NVM. In an example, a dummy phase for a read transaction involves the bus interface controller waiting for the NVM to respond with requested data.

In accordance with example implementations, the fault detection engine may further include an execute timer that corresponds to an overall time for the bus cycle to complete. At the time bus interface controller is starting the bus cycle, the bus interface controller knows the command, clock frequency and controller configuration. From this information, the bus interface controller determines the exact execution time. In an example for the SPI bus, the bus cycle for an Erase command does not have any address phase, dummy phase or data phase. The bus cycle for the Erase command should finish in about eight SPI clock time plus a slight margin (e.g., two SPI clocks) to account for state machine overhead. Therefore, for this example, the bus interface controller sets the execute timer to expire in ten clock periods, or 400 nanoseconds (ns) for a 25 MegaHertz (MHz) SPI clock frequency.

In another example for the SPI bus, for a bus cycle corresponding to a 256 byte write, the bus interface controller determines the execution time based on the following: eight SPI clocks for the command phase; thirty-two SPI clocks for the address phase; 2048 (i.e., 256×8) SPI clocks for data transfer into the NVM; and a slight margin to account for state machine overhead. In another example for the SPI bus, for a bus cycle corresponding to a 100 byte read, the bus interface controller determines the execution time based on the following: eight SPI clocks for the command phase; thirty-two SPI clocks for the address phase; a maximum of eight SPI clocks for the dummy phase; 800 (i.e., 100×8) SPI clocks to get the data from the NVM; and a slight margin to account for state machine overhead.

After starting the timers, the fault detection engine transitions from the state 312 through a sequence of states to check corresponding expiration timers. In accordance with example implementations, checking a timer includes the fault detection engine determining whether the timer has expired. As depicted in FIG. 3, the fault detection engine first transitions from the state 312 to a state 316 in which the fault detection engine checks a command timer for. purposes of determining whether the command phase of the bus cycle lasted for a longer-than-expected time. Stated differently, the fault detection engine checks to see if the command timer has expired. If so, then the fault detection engine transitions to a state 350.

In the state 350, the fault detection engine notifies the recovery engine about the detected unresponsive behavior. The notification may occur in any of a number of different ways. In an example, the fault detection engine asserts an interrupt, and the recovery engine corresponds to an interrupt service routine that, responsive to the interrupt, resets the bus interface controller. In another example, notifying the recovery engine involves the fault detection engine asserting (e.g., setting to a logic one value) a bit of a status register (e.g., a register 264 of FIG. 2) of the bus interface controller to indicate the detected unresponsive behavior. In an example, as further described herein, the recovery engine polls the status register and, through the polling, detects the asserted bit. In another example, the assertion of the bit causes the bus interface controller to generate an interrupt, which is serviced by an interrupt service routine corresponding to the recovery engine.

If, in the state 316, the fault detection engine determines that the command phase did not last for a longer-than-expected time, then, as depicted at 320, the fault detection engine transitions to a state 324 to check an address timer. If the address timer indicates that the address phase lasted for a longer-than-expected time, then as depicted at 326, the bus interface controller transitions to the state 350 and notifies the recovery engine. Otherwise, as depicted at 328, the fault detection engine transitions to a state 332.

In the state 332, the fault detection engine checks a dummy timer for purposes of determining whether a dummy phase of the bus cycle lasted for a longer-than-expected time. As depicted at 334, if so, then the fault detection engine transitions to state 350 and notifies the recovery engine. Otherwise, as depicted at 336, the fault detection engine transitions to a state 340.

In the state 340, the fault detection engine checks an execute timer. The execute timer measures the overall time for the bus cycle and expires if the bus cycle lasted for a longer-than-expected time. If this occurs, then, as depicted at 342, the fault detection engine transitions to the state 350 and notifies the recovery engine. Otherwise, as depicted at 344, the fault detection engine transitions back to the bus idle state 308. As can be appreciated, if the fault detection engine transitions back to the bus idle state 308 from the state 340, then the bus interface controller has not malfunctioned and therefore, did not exhibit any unresponsive behavior in connection with the bus cycle.

Figure 4:
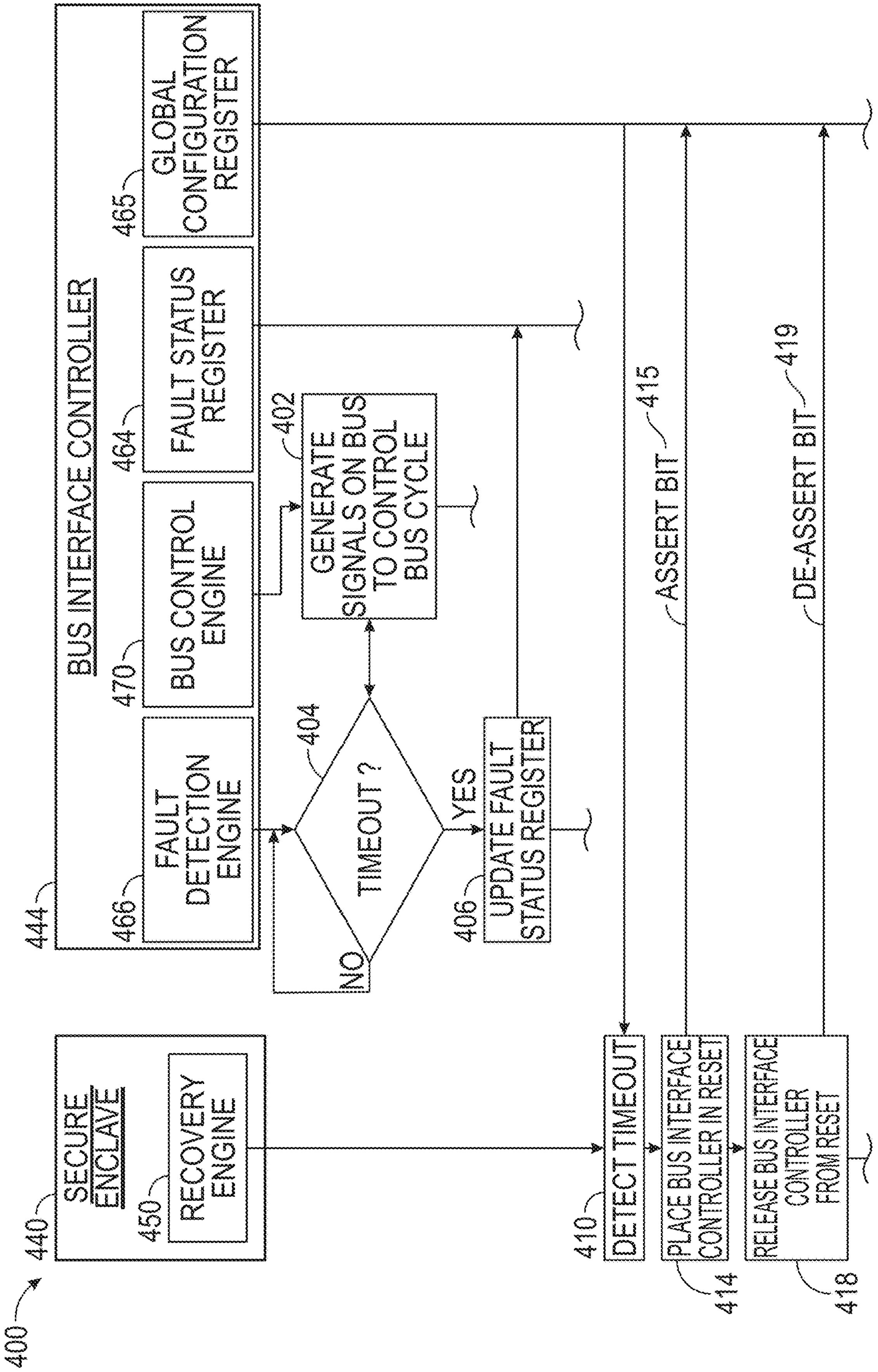
FIG. 4 is a sequence flow diagram depicting actions taken by a recovery engine and a bus interface controller to detect a malfunction of the bus interface controller and recover the bus interface controller from the malfunction, according to an example implementation.

Referring to FIG. 4, a sequence flow diagram 400 depicts actions taken by a recovery engine 450 and a bus interface controller 444 to detect and cure an unresponsive behavior of the bus interface controller 444, in accordance with example implementations. As depicted in FIG. 4, the recovery engine 450 is a component of a secure enclave 440. Moreover, for this example, the bus interface controller 444 includes a fault detection engine 466 to self-detect an unresponsive behavior of the bus interface controller 444. The recovery engine 142 of FIG. 1 and the recovery engine 242 of FIG. 2 are examples of the recovery engine 450. The bus interface controller 146 of FIG. 1 and the bus interface controller 244 of FIG. 2 are examples of the bus interface controller 444. The fault detection engine 266 of FIG. 2 is an example of the fault detection engine 466 of FIG. 4. In addition to the fault detection engine 466, the bus interface controller 444 includes a bus control engine 470, a fault status register 464 and a global configuration register 465. The registers 264 of FIG. 2 are examples of the fault status register 464 and the global configuration register 465. The bus control engine 270 of FIG. 2 is an example of the bus control engine 470.

Pursuant to the sequence flow 400, the bus control engine 470 generates signals on the serial bus to control a bus cycle. In examples, the bus cycle may be associated with a read transaction, a write transaction or an erase transaction. The fault detection engine 466 determines, as depicted at 404, whether a time out has occurred either in connection with a particular phase of the bus cycle or in connection with the overall execution time for the bus cycle.

For this example, the fault detection engine 466 determines that a time out has occurred, and, as depicted at 406, the fault detection engine 466 updates the fault status register 464 (e.g., asserts a particular bit of the register 464) to indicate the detected time out. Stated differently, the update of the fault status register indicates that the fault detection engine 466 has detected the bus interface controller 444 exhibiting an unresponsive behavior.

By updating the fault status register 464, the fault detection engine 466 notifies the recovery engine 450 to the detected unresponsive behavior. As depicted at 410, the recovery engine 450 detects the time out (i.e., becomes aware of the fault detection engine's notification). In an example, the recovery engine 450 detects the time out by polling the fault status register 464 for purposes of determining whether or not a bit indicating detected unresponsive behavior has been asserted. In another example, the assertion of the bit by the fault detection engine 466 triggers, or initiates, the bus interface controller 444 to generate an interrupt, and the recovery engine's detection of the time out corresponds to an interrupt service routine.

Regardless of how the recovery engine 450 detects the time out, the recovery engine 450 proceeds to reset the bus interface controller 444. In an example, the reset is a soft reset in which the recovery engine 450 writes to a global configuration register 465 of the bus interface controller 444 for purposes of resetting the controller 444. More specifically, as depicted at 414 and 415, the recovery engine 450 asserts (e.g., sets to a logical one value) a bit of the global configuration register 465 to place the bus interface controller 444 in a reset state. Moreover, as depicted at 418 and 419, the recovery engine 450 subsequently de-asserts (e.g., sets to a logical zero state) the same bit of the global configuration register 465 for purposes of releasing the bus interface controller 444 from the reset state.

In another example, the recovery engine 450 may perform a reset other than a soft reset of the bus interface controller 444. For example, the recovery engine 450 may assert and de-assert a bit of a register (e.g., a register inside the secure enclave or a register outside of the secure enclave) for purposes of manipulating the state of an external reset terminal of the bus interface controller 444.

Figure 5:
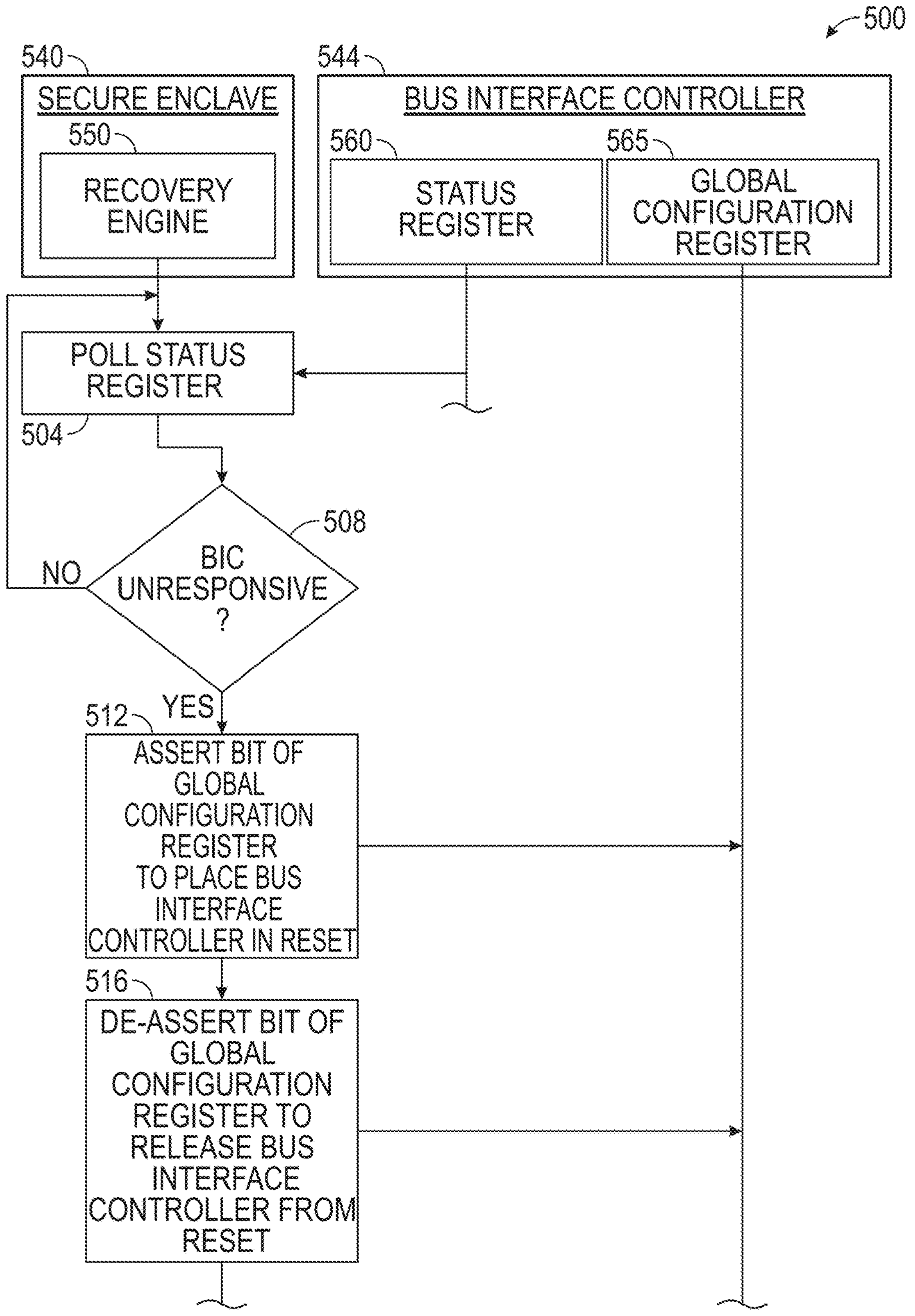
FIG. 5 is a sequence flow diagram depicting actions taken by a recovery engine to detect a malfunction of a bus interface controller and recover the bus interface controller from the malfunction, according to an example implementation.

Referring to FIG. 5, a sequence flow diagram 500 illustrates actions taken by a recovery engine 550 and a bus interface controller 544 for purposes of detecting an unresponsive behavior of the bus interface controller 544 and resetting the bus interface controller 544. For these example implementations, the recovery engine 550, instead of a fault detection engine of the bus interface controller 544, makes the determination of whether the bus interface controller 544 is exhibiting an unresponsive behavior. The recovery engine 550 is part of a secure enclave 540. The secure enclave 140 of FIG. 1 and the secure enclave 240 of FIG. 2 are examples of the secure enclave 540. The recovery engine 142 of FIG. 1 and the recovery engine 242 of FIG. 2 are examples of the recovery engine 550. The bus interface controller 544 includes a status register 560 and a global configuration register 565. The bus interface controller 146 of FIG. 1 and the bus interface controller 244 of FIG. 2 are examples of the bus interface controller 544. The registers 264 of FIG. 2 are examples of the status register 560 and the global configuration register 565.

As depicted at 504 and 508, the recovery engine 550 polls a busy bit of the status register 560. The bus interface controller 544, in accordance with example implementations, uses the logical state of the busy bit to indicate whether the bus interface controller 544 is currently processing a request. In an example, the bus interface controller 544 asserts (e.g., sets to a logical one state) the busy bit to indicate that the bus interface controller 544 is currently processing a request and cannot receive another request. In an example, the bus interface controller 544 de-asserts (e.g., clears, or sets to a logical zero state) the busy bit to indicate that the bus interface controller 544 is not processing a request and therefore can accept a new request.

The recovery engine 550, in an example, through the polling, samples the logical state of the busy bit for purposes of determining whether, as indicated by the samples, the busy bit has been asserted for a time interval that exceeds a predefined time interval threshold. Stated differently, through the polling, the recovery engine 550 determines whether the current bus cycle is taking an unexpectedly long time. As depicted at 504, in the polling, the recovery engine 550 reads the busy bit and proceeds to, as depicted at 508, determine whether the polling indicates that the busy bit has been asserted for a time interval that exceeds the predefined time interval threshold. In an example, the recovery engine 550 may read the busy bit at predefined time increments, and based on the consecutive number of busy bit reads, the recovery engine 550 determines whether the predefined time interval threshold has been exceeded. It is noted that the recovery engine 550 starts the count over again in response to the engine 550 reading a de-asserted busy bit.

If the recovery engine 550 determines, as indicated by the polling, that the bus interface controller 544 is exhibiting an unresponsive behavior, then the recovery engine 550 resets the bus interface controller 544. As depicted in FIG. 5, this reset may be a soft reset in which the recovery engine 550 asserts (block 512) a bit of the global configuration register 565 to place the bus interface controller 544 in a reset state and then de-asserts the bit (as depicted at 516) for purposes of releasing the bus interface controller 544 from the reset state. In accordance with further examples, the recovery engine 550 may reset the bus interface controller 544 using a reset other than a soft reset, such as the way described in connection with FIG. 4 above.

In accordance with further example implementations, a recovery engine may determine whether a bus interface controller is exhibiting an unresponsive behavior in other ways. For example, in accordance with further example implementations, a recovery engine (e.g., the recovery engine 142 of FIG. 1 or the recovery engine 242 of FIG. 2) uses register access as an indicator or whether a bus interface controller is exhibiting an unresponsive behavior. In an example, the recovery engine attempts to write to a register (e.g., a register to receive data representing a command or an address of a request) of the bus interface controller, and the recovery engine determines that the bus interface controller is exhibiting an unresponsive behavior in response to the bus interface controller not acknowledging the write. In another example, the recovery engine attempts to read content of a register of the bus interface controller, and the recovery engine determines that the bus interface controller is exhibiting an unresponsive behavior in response to the read being unsuccessful.

Other implementations are contemplated, which are within the scope of the appended claims. For example, in accordance with yet further example implementations, an entity that submits requests to a bus interface controller may send a message to inform a recovery engine (e.g., the recovery engine 142 of FIG. 1 or the recovery engine 242 of FIG. 2) that the bus interface controller is exhibiting an unresponsive behavior. In an example, a management processing core (e.g., the management processing core 154 of FIG. 1) may determine that a bus interface controller is exhibiting an unresponsive behavior and send a corresponding message to the recovery engine. In an example, the message may be a security service API call that is provided and handled by a secure bridge (e.g., the secure bridge 262 of FIG. 2) of a secure enclave (e.g., the secure enclave 240 of FIG. 2) that contains the recovery engine (e.g., the recovery engine 242 of FIG. 2). In an example, the management processing core may determine that the bus interface controller is exhibiting an unresponsive behavior based on the interaction (e.g., fault register polling or attempted register access) of the management processing core with the bus interface controller.

In another example, the management processing core may determine that the bus interface controller is exhibiting an unresponsive behavior based on a notification or indication that is provided by a fault detection engine (e.g., the fault detection engine 266 of FIG. 2) of the bus interface controller. In another example, the management processing core may determine that the bus interface controller is exhibiting an unresponsive behavior responsive to the management processing core receiving a message (e.g., a Redfish API call) from an application (e.g., an application 115 of FIG. 1) indicating that the bus interface controller is malfunctioning. In another example, an SRoT engine (e.g., the SRoT engine 143 of FIG. 1 or the SRoT engine 243 of FIG. 2) may, responsive to detecting that a bus interface controller is exhibiting an unresponsive behavior, request the recovery engine to reset the bus interface controller. The SRoT engine may then, after the bus interface controller is reset, change the bus interface controller's configuration and then retry using the bus interface controller.

In accordance with further implementations, a management controller other than a baseboard management controller may include a recovery engine to recover a bus interface controller, as described herein. In an example, the management controller is a chassis management controller. In another example, the management controller is a smart I/O peripheral.

Figure 6:
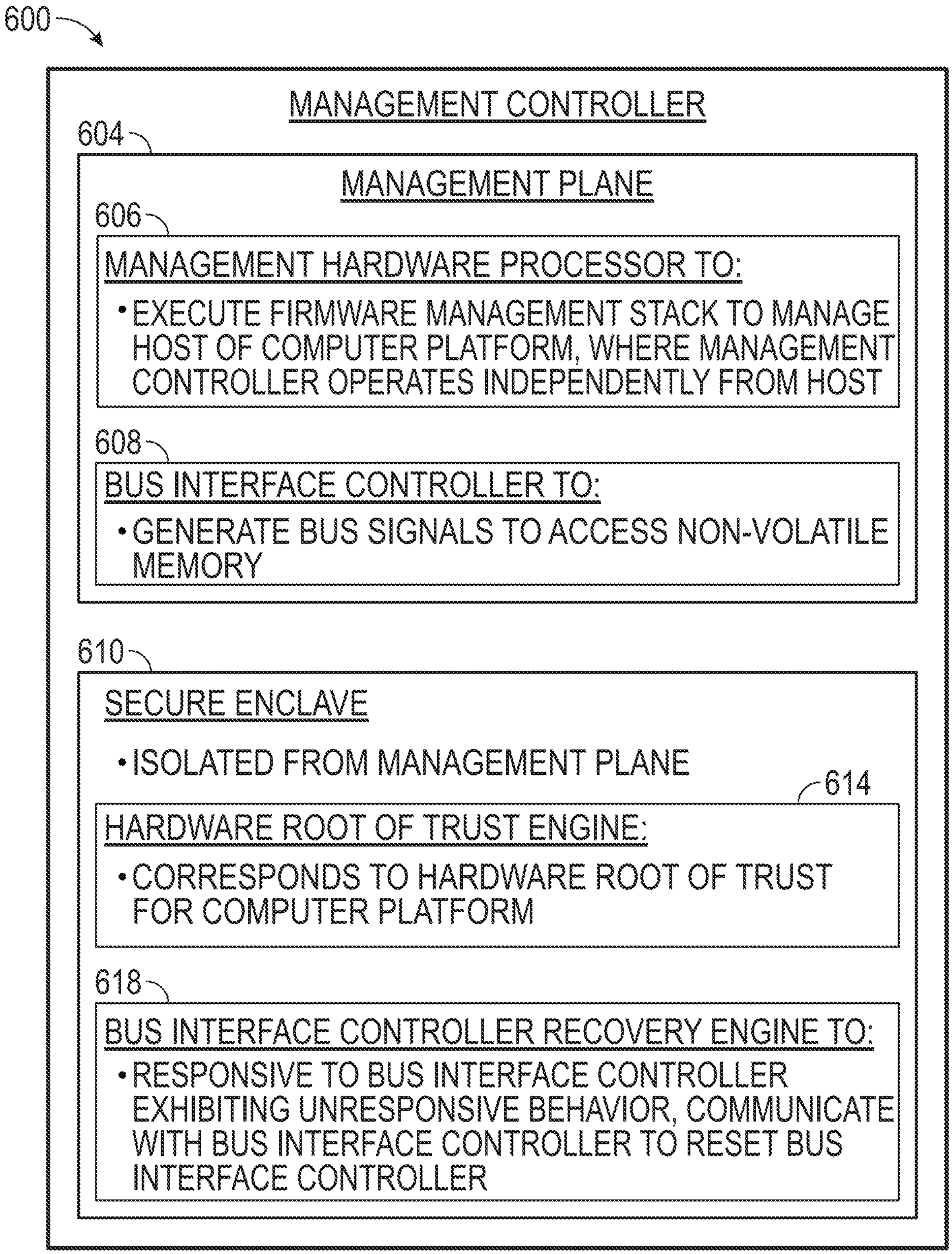
FIG. 6 is a block diagram of a management controller that includes a secure enclave-based bus interface controller recovery engine, according to an example implementation.

Referring to FIG. 6, in accordance with example implementations, a management controller 600 includes a management plane 604 and a secure enclave 610. In an example, the management controller 600 is a baseboard management controller. In another example, the management controller 600 is a chassis management controller. In another example, the management controller is a smart I/O peripheral.

In an example, the management plane 604 provides management services for a computer platform. In example, the management services include operating system runtime services; resource detection and initialization; and pre-operating system services. In other examples, the management services include monitoring telemetry values (e.g., cooling fan speeds, temperature sensors and tamper indication sensors) and reporting unexpected or out-of-range telemetry values. In other examples, the management services include detecting and reporting an expected inventory. In other examples, the management services include remotely-managed functions.

The management plane 604 includes a management hardware processor 606 and a bus interface controller 608. The management hardware processor 606 executes a firmware management stack to manage a host. The management controller is part of a computer platform, and the management controller operates independently from the host. In an example, the firmware management stack is open-source firmware. In an example, the firmware management stack is an OpenBMC firmware management stack.

The bus interface controller 608 generates bus signals to access a non-volatile memory. In an example, the bus interface controller 608 is a SPI controller. In another example the bus interface controller 608 is an I2C controller. In another example, the bus interface controller 608 is an I3C controller. In an example, the non-volatile memory includes a collection of NOR flash memory devices. In another example, the non-volatile memory includes a collection of NAND flash memory devices. In an example, the non-volatile memory stores system firmware. In an example, the non-volatile memory stores a firmware management stack image. In an example, the non-volatile memory stores system management data. In an example, the non-volatile memory stores UEFI applications. In an example, the non-volatile memory stores a BIOS image. In an example, the non-volatile memory stores power on self-test instructions. In an example, the non-volatile memory stores firmware executed by a security processor of the management controller.

The secure enclave 610 is isolated from the management plane 604 and includes a hardware root of trust engine 614 and a bus interface controller recovery engine 618. The hardware root of trust engine 614 corresponds to a hardware root of trust for the computer platform. In an example, the secure enclave 610 has an associated cryptographic boundary. In an example, the secure enclave 610 stores an immutable fingerprint, which is used by the hardware root of trust engine to validate an initial portion of the firmware stored in the non-volatile memory before this initial portion of firmware is executed.

In an example, the secure enclave 610 performs security services for the computer platform. In an example, the security services include firmware validation. In another example, the security services include cryptographic services, include decryption and encryption. In an example, the security services include managing the storage of cryptographic artifacts for the computer platform. In an example, the security services includes monitoring environmental indicators as part of providing a computer platform tamper detection service. In an example, the secure enclave 610 includes cryptographic accelerators. In an example, the secure enclave 610 includes a secure bridge to controller communication with the secure enclave 610 via security service APIs.

In an example, the bus interface recovery engine 618 is formed by a security processor of the secure enclave 610 executing hardware processor-readable instructions. In another example, the bus interface recovery engine 618 includes a dedicated hardware circuit (e.g., an ASIC, FPGA or PLD) of the secure enclave 610.

The bus interface controller recovery engine 618, responsive to the bus interface controller 608 exhibiting an unresponsive behavior, communicates with the bus interface controller 608 to reset the bus interface controller 608. In an example, an unresponsive behavior corresponds to the bus interface controller 608 taking a longer-than-expected time to complete a bus cycle. In an example, an unresponsive behavior corresponds to the bus interface controller 608 taking a longer-than-expected time to complete a particular phase of a bus cycle. In an example, an unresponsive behavior corresponds to the bus interface controller 608 asserting a busy bit for a longer-than-expected time interval. In an example, an unresponsive behavior corresponds to the bus interface controller 608 not responding to a register access attempt. In an example, the bus interface controller 608 exhibiting the unresponsive behavior corresponds to a fault detection engine of the bus interface controller 608 detecting the unresponsive behavior. In an example, the bus interface controller 608 exhibiting the unresponsive behavior corresponds to the recovery engine polling a fault register of the bus interface controller 608 to detect the unresponsive behavior. In an example, the bus interface controller 608 exhibiting the unresponsive behavior corresponds to the recovery engine servicing an interrupt generated by the bus interface controller 608 due to the bus interface controller 608 self-detecting the unresponsive behavior.

In an example, the bus interface controller recovery engine 618 writes to a register (e.g., a global configuration register) of the bus interface controller 608 to perform a soft reset of the bus interface controller 608 in response to the bus interface controller 608 exhibiting an unresponsive behavior. In an example, the bus interface controller recovery engine 618, for purposes of resetting the bus interface controller 608, asserts a bit of a register to place the bus interface controller 608 in a in a reset state, and then the bus interface controller recovery engine 618 de-asserts the bit to release the bus interface controller 618 from the reset state. In another example, the bus interface controller recovery engine 618 asserts and de-asserts a bit of a register (e.g., a register inside the secure enclave 610 or a register outside of the secure enclave 610) for purposes of manipulating the state of an external reset terminal of the bus interface controller 608.

Figure 7:
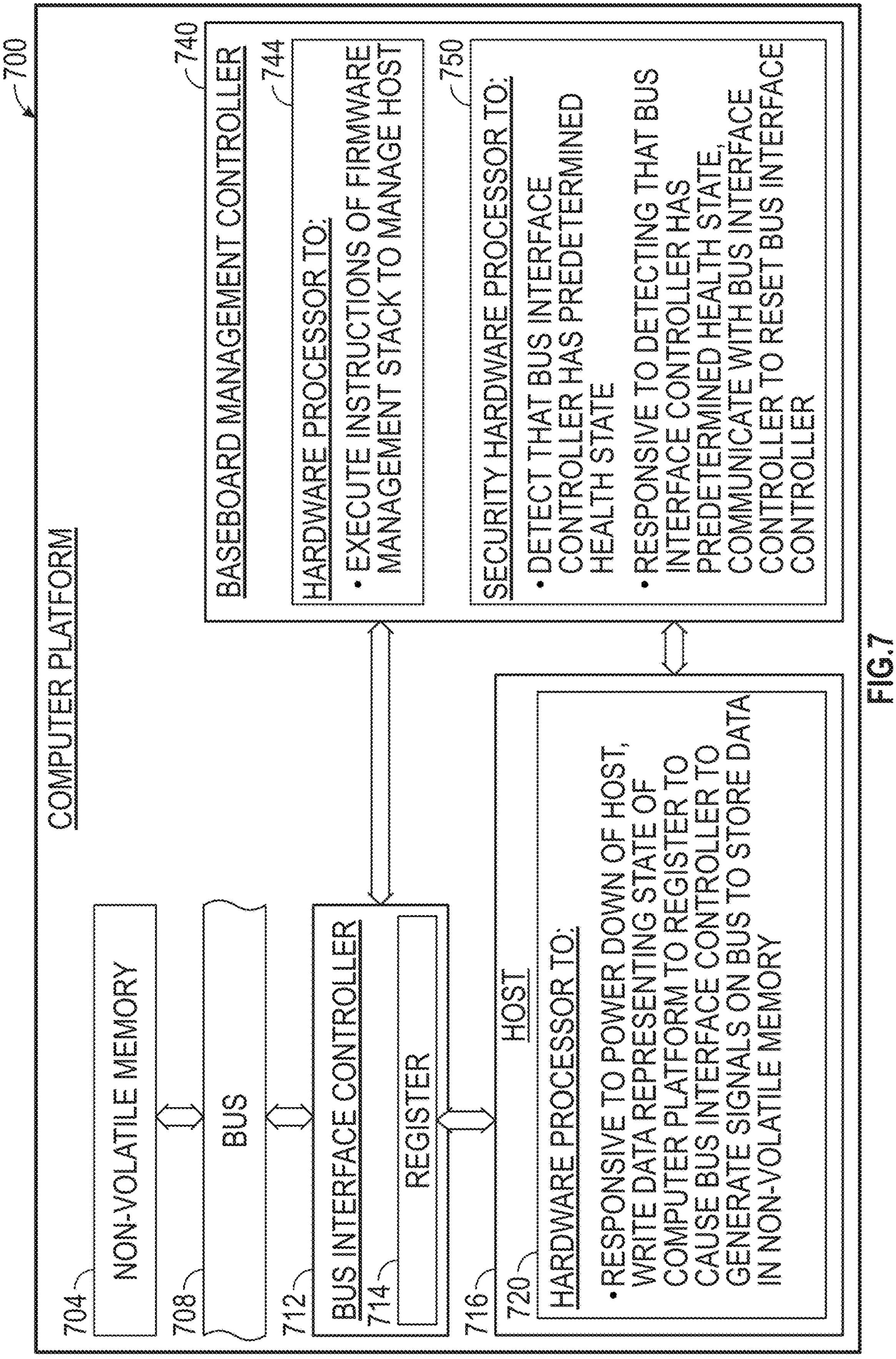
FIG. 7 is a block diagram of a computer platform that has a baseboard management controller-based bus interface controller recovery engine, according to an example implementation.

Referring to FIG. 7, in accordance with example implementations, a computer platform 700 includes a non-volatile memory 704, a bus 708, a bus interface controller 712, a host 716, a baseboard management controller 740 and a security hardware processor 750. The bus 708 is coupled to the non-volatile memory 704. The bus interface controller 712 includes a register 714.

In an example, the computer platform 700 is a server, such as a blade server, a rack server or a tower server. In other examples, the computer platform 700 is a client, a desktop, a smartphone, a wearable computer, a networking component, a gateway, a network switch, a storage array, a portable electronic device, a portable computer, a tablet computer, a thin client, a laptop computer, a television, a modular switch, a consumer electronics device, an appliance, an edge processing system, a sensor system, a watch, a removable peripheral card, or, in general, any other processor-based electronic device.

In an example, the register 714 receives a command corresponding to the request. In another example, the register 714 receives data corresponding to the request. In an example, the register 714 receives an address corresponding to the request.

The host 716 includes a hardware processor 720 that, responsive to a power down of the host 716, writes data representing a state of the computer platform 700 to the register 714 to cause the bus interface controller 712 to generate signals on the bus 708 to store the data in the non-volatile memory 704. In an example, the data stored in the non-volatile memory 704 is system management data. In an example, the data stored in the non-volatile memory 704 represents a state of a management engine of the computer platform 700. In an example, the management engine is part of an I/O bridge of the computer platform 100. In an example, the data stored in the non-volatile memory 704 represents an anti-replay table. In another example, the data stored in the non-volatile memory 704 represents a version of firmware executed by the management engine. In another example, the data stored in the non-volatile memory 704 represents a default configuration file for the management engine. In another example, the data stored in the non-volatile memory 704 represents a platform vendor-specific default configuration file for the management engine.

The baseboard management controller 740 includes a hardware processor 744 that execute instructions of a firmware management stack to manage the host 716. In an example, the hardware processor 744 includes one or multiple CPU cores. In an example, the firmware management stack is open-source firmware. In an example, the firmware management stack is an OpenBMC firmware management stack.

The security hardware processor 750 detects that the bus interface controller 712 has a predetermined health state. The security hardware processor 750, responsive to detecting that the bus interface controller 712 has the predetermined health state, communicates with the bus interface controller 712 to reset the bus interface controller 712. In an example, the predetermined health state corresponds to a malfunction of the bus interface controller 712. In an example, the bus interface controller 712 having the predetermined health state corresponds to the bus interface controller 712 exhibiting an unresponsive behavior.

In an example, the security hardware processor 750 communicating with the bus interface controller 712 to reset the bus interface controller 712 includes the security hardware processor 750 performing a soft reset of the bus interface controller 712. In an example, the security hardware processor 750, for purposes of resetting the bus interface controller 712, asserts a bit of a register of the bus interface controller 712 to place the bus interface controller 712 in a in a reset state, and then the security hardware processor 750 de-asserts the bit to release the bus interface controller 712 from the reset state.

Figure 8:
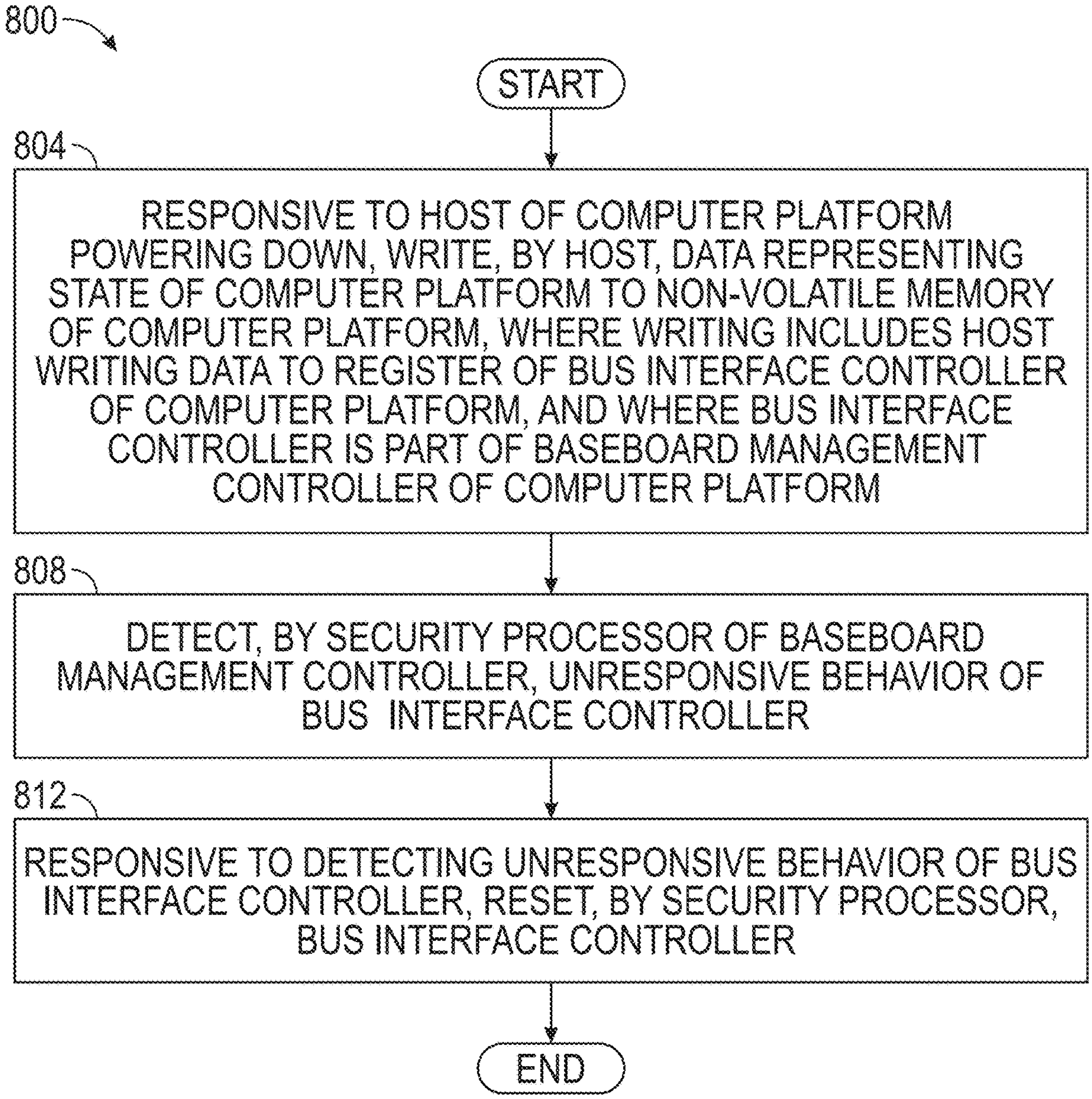
FIG. 8 is a flow diagram depicting a technique to detect and recover an unresponsive bus interface controller, according to an example implementation.

Referring to FIG. 8, in accordance with example implementations, a technique 800 includes, responsive to a host of a computer platform powering down, writing (block 804) by the host, data representing a state of the computer platform to a non-volatile memory of the computer platform. The bus interface controller is part of a baseboard management controller of the computer platform.

In an example, the computer platform is a server, such as a blade server, a rack server or a tower server. In other examples, the computer platform is a client, a desktop, a smartphone, a wearable computer, a networking component, a gateway, a network switch, a storage array, a portable electronic device, a portable computer, a tablet computer, a thin client, a laptop computer, a television, a modular switch, a consumer electronics device, an appliance, an edge processing system, a sensor system, a watch, a removable peripheral card, or, in general, any other processor-based electronic device.

In an example, the powering down of the computer platform includes a main power supply of the computer platform being turned off. In an example, powering down of the computer platform includes an auxiliary power supply of the computer platform remaining turned on.

In an example, the writing (block 804) of the data to the non-volatile memory includes writing system management data to the non-volatile memory. In an example, the system management data represents a state of a management engine of the computer platform. In an example, the management engine is part of an I/O bridge of the computer platform. In an example, the system management data includes data representing an anti-replay table. In another example, the system management data includes data that represents a version of firmware executed by the management engine. In another example, the system management data includes data that represents a default configuration file for the management engine. In another example, the system management data includes data that represents a platform vendor-specific default configuration file for the management engine.

The writing (block 804) includes the host writing the data to a register of a bus interface controller of the computer platform. In an example, the writing includes writing a command corresponding to the register. In another example, the writing includes writing system management data to the register. In another example, the writing includes writing an address to the register corresponding to the request.

The technique 800 includes detecting (block 804), by a security processor of the baseboard management controller an unresponsive behavior of the bus interface controller. In an example, an unresponsive behavior corresponds to the bus interface controller taking a longer-than-expected time to complete a bus cycle. In an example, an unresponsive behavior corresponds to the bus interface controller taking a longer-than-expected time to complete a particular phase of a bus cycle. In an example, an unresponsive behavior corresponds to the bus interface controller asserting a busy bit for a longer-than-expected time interval. In an example, an unresponsive behavior corresponds to the bus interface controller not responding to a register access attempt.

In an example, the detecting (block 804) includes a fault detection engine of the bus interface controller detecting the unresponsive behavior. In another example, the detecting (block 804) includes the security processor polling a fault register of the bus interface controller. In another example, detecting (block 804) that unresponsive behavior includes the security processor servicing an interrupt generated by the bus interface controller due to the bus interface controller self-detecting the unresponsive behavior. In another example, the detecting (804) includes a hardware processing core of the baseboard management controller's management plane sending a message (e.g., making an API call) to the security processor.

The technique 800 includes, responsive to detecting the unresponsive behavior of the bus interface controller, resetting (block 812), by the security processor, the bus interface controller. In an example, the resetting (block 812) includes performing a soft reset of the bus interface controller. In another example, the resetting (block 812) includes the security processor manipulating the state of a reset terminal of the bus interface controller.

In accordance with example implementations, the bus interface controller includes a fault status register, and the bus interface controller includes a fault detection circuit to detect a fault that is associated with the bus interface controller. The fault detection circuit causes the fault status register to indicate detection of the fault. The bus interface controller recovery engine reads the fault status register and resets the bus interface controller responsive to the fault status register indicating detection of the fault. Among the potential advantages, a malfunctioning bus interface controller may be recovered without power cycling the computer platform.

In accordance with example implementations, the bus interface controller includes a fault detection circuit to detect a fault associated with the bus interface controller and generate an interrupt responsive to detection of the fault. The bus interface controller recovery engine resets the bus interface controller responsive to the interrupt. Among the potential advantages, a malfunctioning bus interface controller may be recovered without power cycling the computer platform.

In accordance with example implementations, the unresponsive behavior corresponds to at least one of a bus cycle associated with the bus interface controller or a phase of the bus cycle exceeding a predefined time interval threshold. Among the potential advantages, a malfunctioning bus interface controller may be recovered without power cycling the computer platform.

In accordance with example implementations, the bus interface controller includes a register. The register includes a bit representing whether the bus interface controller is busy. The bus interface controller recovery engine polls the bit to determine whether the bus interface controller is busy for a time interval that exceeds a threshold duration. The bus interface controller recovery engine resets the bus interface controller responsive to a determination that the bus interface controller is busy for the time interval that exceeds the threshold duration. Among the potential advantages, a malfunctioning bus interface controller may be recovered without power cycling the computer platform.

In accordance with example implementations, the bus interface controller includes a register. The bus interface controller recovery engine attempts to access the register, and the bus interface controller resets the bus interface controller responsive to a failure of the attempted access. Among the potential advantages, a malfunctioning bus interface controller may be recovered without power cycling the computer platform.

In accordance with example implementations, the management hardware processor generates an indication of whether the bus interface controller exhibits the unresponsive behavior. The bus interface controller recovery engine resets the bus interface controller responsive to the indication representing that the bus interface controller exhibits the unresponsive behavior. Among the potential advantages, a malfunctioning bus interface controller may be recovered without power cycling the computer platform.

In accordance with example implementations, the indication includes a message that is sent by the management processor to the bus interface controller recovery engine. Among the potential advantages, a malfunctioning bus interface controller may be recovered without power cycling the computer platform.

In accordance with example implementations, the bus interface controller includes a register, and the register includes a bit to initiate the reset. The bus interface controller recovery engine writes to the register to manipulate a state of the bit to initiate the reset. Among the potential advantages, a malfunctioning bus interface controller may be recovered without power cycling the computer platform.

In the context that is used herein, a BMC is a specialized service processor that monitors the physical state of a server or other hardware using sensors and communicates with a management system through a management network. The BMC may also communicate with applications executing at the operating system level through IOCTL interface drivers, REST API calls, or some other system software proxy that facilitates communication between the BMC and applications. The BMC may have hardware level access to hardware devices that are located in a server chassis including system memory. The BMC may be able to directly modify the hardware devices. The BMC may operate independently of the operating system of the system in which the BMC is disposed. A BMC may be located on the motherboard or main circuit board of the server or other device to be monitored.

The fact that a BMC is mounted on a motherboard of the managed server/hardware or otherwise connected or attached to the managed server/hardware does not prevent the BMC from being considered "separate" from the server/hardware. As used herein, BMC has management capabilities for sub-systems of a computing device, and is separate from a processing resource that executes an operating system of a computing device. The BMC is separate from a processor, such as a central processing unit, which executes a high-level operating system or hypervisor on a system.

The detailed description set forth herein refers to the accompanying drawings. Wherever possible, the same reference numbers are used in the drawings and the foregoing description to refer to the same or similar parts. It is to be expressly understood, however, that the drawings are for the purpose of illustration and description only. While several examples are described in this document, modifications, adaptations, and other implementations are possible. Accordingly, the detailed description does not limit the disclosed examples. Instead, the proper scope of the disclosed examples may be defined by the appended claims.

The terminology used herein is for the purpose of describing particular examples only and is not intended to be limiting. As used herein, the singular forms "a," "an," and "the" are intended to include the plural forms as well, unless the context clearly indicates otherwise. The term "plurality," as used herein, is defined as two or more than two. The term "another," as used herein, is defined as at least a second or more. The term "connected," as used herein, is defined as connected, whether directly without any intervening elements or indirectly with at least one intervening element, unless otherwise indicated. Two elements can be coupled mechanically, electrically, or communicatively linked through a communication channel, pathway, network, or system. The term "and/or" as used herein refers to and encompasses any and all possible combinations of the associated listed items. It will also be understood that, although the terms first, second, third, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on.

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:

1. A management controller comprising:

a management plane comprising:

a management hardware processor to execute a firmware management stack to manage a host, wherein the management controller is part of a computer platform, and wherein the management controller operates independently from the host;

a bus interface controller to generate bus signals to access a non-volatile memory; and a secure enclave isolated from the management plane, wherein the secure enclave comprises:

a hardware root of trust engine corresponding to a hardware root of trust for the computer platform; and a bus interface controller recovery engine to, responsive to the bus interface controller exhibiting an unresponsive behavior, communicate with the bus interface controller to reset the bus interface controller.

2. The management controller of claim 1, wherein:

the bus interface controller comprises a fault status register;

the bus interface controller comprises a fault detection circuit to detect a fault associated with the bus interface controller;

the fault detection circuit to cause the fault status register to indicate detection of the fault; and the bus interface controller recovery engine to read the fault status register and reset the bus interface controller responsive to the fault status register indicating detection of the fault.

3. The management controller of claim 1, wherein:

the bus interface controller comprises a fault detection circuit to detect a fault associated with the bus interface controller and generate an interrupt responsive to detection of the fault; and the bus interface controller recovery engine to reset the bus interface controller responsive to the interrupt.

4. The management controller of claim 1, wherein the unresponsive behavior corresponds to at least one of a bus cycle associated with the bus interface controller or a phase of the bus cycle exceeding a predefined time interval threshold.

5. The management controller of claim 1, wherein:

the bus interface controller comprises a register;

the register comprises a bit representing whether the bus interface controller is busy; and the bus interface controller recovery engine to further:

poll the bit to determine whether the bus interface controller is busy for a time interval that exceeds a threshold duration; and reset the bus interface controller responsive to a determination that the bus interface controller is busy for the time interval that exceeds the threshold duration.

6. The management controller of claim 1, wherein:

the bus interface controller comprises a register; and the bus interface controller recovery engine to further:

attempt to access the register; and reset the bus interface controller responsive to a failure of the attempted access.

7. The management controller of claim 1, wherein:

the management hardware processor to generate an indication of a health of the bus interface controller; and the bus interface controller recovery engine to further reset the bus interface controller responsive to the indication representing that the bus interface controller exhibits the unresponsive behavior.

8. The management controller of claim 7, wherein the indication comprises a message sent by the management hardware processor to the bus interface controller recovery engine.

9. The management controller of claim 1, wherein:

the bus interface controller comprises a register;

the register comprises a bit to initiate the reset; and the bus interface controller recovery engine to write to the register to manipulate a state of the bit to initiate the reset.

10. The management controller of claim 1, further comprising:

an additional bus interface controller, wherein a monitoring engine selectively resets the additional bus interface controller based on a health of the additional bus interface controller.

11. The management controller of claim 10, wherein the additional bus interface controller is located in one of the management plane or the secure enclave.

12. The management controller of claim 1, wherein the non-volatile memory stores a firmware image associated with a boot of the computer platform.

13. A computer platform comprising:

a non-volatile memory;

a bus coupled to the non-volatile memory;

a bus interface controller coupled to the bus, wherein the bus interface controller comprises a register;

a host comprising a first hardware processor to, responsive to a power down of the host, write data representing a state of the computer platform to the register to cause the bus interface controller to generate signals on the bus to store the data in the non-volatile memory; and a baseboard management controller comprising a second hardware processor to execute instructions of a firmware management stack to manage the host; and a security hardware processor to:

detect that the bus interface controller has a predetermined health state; and responsive to detecting that the bus interface controller has the predetermined health state, communicate with bus interface controller to reset the bus interface controller.

14. The computer platform of claim 13, wherein the bus interface controller is part of the baseboard management controller, the computer platform further comprising a semiconductor package comprising the baseboard management controller.

15. The computer platform of claim 13, wherein:

the non-volatile memory stores an image corresponding to the firmware management stack;

the baseboard management controller further comprises a volatile memory; and the security hardware processor to further, responsive to a power up of the baseboard management controller:

use the bus interface controller to read the firmware management stack from the non-volatile memory; and store the firmware management stack in the volatile memory.

16. The computer platform of claim 13, further comprising:

a bridge comprising a management engine separate from the baseboard management controller, wherein the management engine to use the bus interface controller to write data to the non-volatile memory responsive to the computer platform undergoing a power cycle.

17. A method comprising:

responsive to a host of a computer platform powering down, writing, by the host, data representing a state of the computer platform to a non-volatile memory of the computer platform, wherein the writing comprises the host writing the data to a register of a bus interface controller of the computer platform, and wherein the bus interface controller is part of a baseboard management controller of the computer platform;

detecting, by a security processor of the baseboard management controller, an unresponsive behavior of the bus interface controller; and responsive to detecting the unresponsive behavior of the bus interface controller, resetting, by the security processor, the bus interface controller.

18. The method of claim 17, further comprising:

detecting, by the bus interface controller, a time out of an operation of the bus interface controller; and responsive to the detection of the time out of the operation, providing, by the bus interface controller, a notification of the detection of the time out of the operation, wherein detecting the unresponsive behavior comprises receiving, by the security processor, the notification.

19. The method of claim 17, further comprising:

polling, by the security processor, a state of a register of the bus interface controller in multiple polling transactions, wherein detecting the unresponsive behavior comprises determining, by the security controller, whether the bus interface controller exhibits the unresponsive behavior based on the polling.

20. The method of claim 17, wherein resetting the bus interface controller comprises:

writing, by the security processor, to a configuration register of the bus interface controller to transition a bit of the configuration register from a first logic state to a second logic state, wherein transitioning of the bit from the first logic state to the second logic state transitions the bus interface controller to a reset state; and writing, by the security processor, to the configuration register to transition the bit from the second logic state to the first logic state, wherein transitioning of the bit from the second logic state to the first logic state releases the bus interface controller from the reset state.

* * * * *